US011615580B2

(12) United States Patent
Daniels et al.

(10) Patent No.: US 11,615,580 B2
(45) Date of Patent: Mar. 28, 2023

(54) METHOD, APPARATUS AND COMPUTER PROGRAM PRODUCT FOR GENERATING A PATH OF AN OBJECT THROUGH A VIRTUAL ENVIRONMENT

(71) Applicants: Sony Group Corporation, Tokyo (JP);
Sony Europe B.V., Weybridge (GB)

(72) Inventors: Anthony Daniels, Basingstoke (GB);
William Brennan, Basingstoke (GB)

(73) Assignees: SONY CORPORATION, Tokyo (JP);
SONY EUROPE B.V., Weybridge (GB)

( * ) Notice: Subject to any disclaimer, the term of this patent is extended or adjusted under 35 U.S.C. 154(b) by 0 days.

(21) Appl. No.: 17/446,998

(22) Filed: Sep. 7, 2021

(65) Prior Publication Data

US 2022/0092844 A1 Mar. 24, 2022

(30) Foreign Application Priority Data

Sep. 18, 2020 (GB) ..................................... 2014708

(51) Int. Cl.
*G06T 15/10* (2011.01)
*G06T 7/292* (2017.01)
(Continued)

(52) U.S. Cl.
CPC .............. *G06T 15/10* (2013.01); *G06T 7/292* (2017.01); *G06T 7/70* (2017.01); *G06T 17/00* (2013.01);
(Continued)

(58) Field of Classification Search
CPC ........... G06T 7/292; G06T 2207/30224; G06T 15/10; G06T 7/70; G06T 17/00; G06T 2207/20081
See application file for complete search history.

(56) References Cited

U.S. PATENT DOCUMENTS 6,011,562 A * 1/2000 Gagne ..................... G06T 13/40
345/473
9,211,439 B1 * 12/2015 Pedenko ................. A63B 69/36
(Continued)

FOREIGN PATENT DOCUMENTS

EP 2 034 441 A1 3/2009
JP 2017-151075 A 8/2017

OTHER PUBLICATIONS

Dietrich Carlos et al.: "Baseball4D: A tool for Baseball Game Reconstruction & Visualization", 2014 IEEE Conference On Visual Analytics Science And Technology (VAST), XP032736875, IEEE, Oct. 25, 2014, pp. 23-32.
(Continued)

*Primary Examiner* — Phi Hoang
(74) *Attorney, Agent, or Firm* — Oblon, McClelland, Maier & Neustadt, L.L.P.

(57) ABSTRACT

A method of generating a path of an object through a virtual environment is provided, the method comprising: receiving image data, at a first instance of time, from a plurality of image capture devices arranged in a physical environment; receiving image data, at an at least one second instance of time after the first instance of time, from a plurality of image capture devices arranged in the physical environment; detecting a location of a plurality of points associated with an object within the image data from each image capture device at the first instance of time and the at least one second instance of time; projecting the location of the plurality of points associated with the object within the image data from each image capture device at the first instance of time and the at least one second instance of time into a virtual environment to generate a location of the plurality of points associated with the object in the virtual environment at each instance of time; and generating a path of the object through the virtual environment using the location of the plurality of points associated with the object in the virtual environment,
(Continued)

the path being indicative of the position and orientation of the object through the virtual environment.

19 Claims, 11 Drawing Sheets

(51) Int. Cl.
  G06T 7/70 (2017.01)
  G06T 17/00 (2006.01)
(52) U.S. Cl.
  CPC .............. *G06T 2207/20081* (2013.01); *G06T 2207/30224* (2013.01)

(56) References Cited

U.S. PATENT DOCUMENTS

| | | | |
|---|---|---|---|
| 9,350,951 B1* | 5/2016 | Rowe | G06T 7/66 |
| 2014/0228123 A1* | 8/2014 | Polzin | G06V 40/23 |
| | | | 463/36 |
| 2015/0022447 A1* | 1/2015 | Hare | G06F 3/017 |
| | | | 345/158 |
| 2017/0270354 A1 | 9/2017 | Painter | |
| 2018/0339223 A1* | 11/2018 | Haas | A63F 13/25 |
| 2018/0361223 A1* | 12/2018 | Cherryhomes | G09B 19/0038 |
| 2019/0147219 A1 | 5/2019 | Thornbrue et al. | |
| 2019/0209909 A1* | 7/2019 | Thornbrue | G06K 9/00523 |
| 2020/0085348 A1* | 3/2020 | Lillie | A61B 5/4533 |
| 2020/0230482 A1 | 7/2020 | Thornbrue et al. | |
| 2021/0142479 A1* | 5/2021 | Phogat | G06T 11/60 |
| 2021/0312657 A1* | 10/2021 | Monir | G06N 5/003 |
| 2022/0161117 A1* | 5/2022 | Jessop | G16H 50/30 |

OTHER PUBLICATIONS

Nina Wiedemann et al.: "A Tracking System For Baseball Game Reconstruction", Arxiv.Org, Cornell University Library, XP081617369, Mar. 8, 2020, pp. 1-27.

* cited by examiner

METHOD, APPARATUS AND COMPUTER PROGRAM PRODUCT FOR GENERATING A PATH OF AN OBJECT THROUGH A VIRTUAL ENVIRONMENT

BACKGROUND

Field of the Disclosure

The field of the present disclosure relates to a method, apparatus and computer program product for generating a path of an object through a virtual environment.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present disclosure.

In recent years, there has been an increase in the levels of video coverage of events (such as sporting events or the like). That is, the number of broadcasters or providers of video content has significantly increased in line with increased demand for video coverage of these events. Moreover, content digesters (such as viewers and consumers of the video content) now demand increasingly high levels of video services from the broadcasters and providers in relation to the event (or events) being covered.

In particular, there is an interest in using video coverage of an event in order to provide certain additional information, which has not previously been available to content digesters. In part, this is due to a desire to provide an enhanced viewing experience and to enable an increased sense of immersion in the event. Moreover, provision of certain types of additional information may be particularly useful when analysing an event that has occurred.

However, it can be difficult to provide suitable additional information for certain types of events.

In particular, certain events (such as sporting events or the like) are often complex comprising a number of different objects. It can be difficult to reliably analyse a specific object within the event owing to the number of different objects that are present. Furthermore, movements and movement patterns of objects in this events can be quite complex. This makes it more difficult to obtain certain information regarding these objects from images of the event.

Hence, the demand for additional information may often exceed that which can be provided.

It is an aim of the present disclosure to address these issues.

SUMMARY

In a first aspect of the present disclosure, a method of generating a path of an object through a virtual environment is provided, the method comprising: receiving image data, at a first instance of time, from a plurality of image capture devices arranged in a physical environment; receiving image data, at an at least one second instance of time after the first instance of time, from a plurality of image capture devices arranged in the physical environment; detecting a location of a plurality of points associated with an object within the image data from each image capture device at the first instance of time and the at least one second instance of time; projecting the location of the plurality of points associated with the object within the image data from each image capture device at the first instance of time and the at least one second instance of time into a virtual environment to generate a location of the plurality of points associated with the object in the virtual environment at each instance of time; and generating a path of the object through the virtual environment using the location of the plurality of points associated with the object in the virtual environment, the path being indicative of the position and orientation of the object through the virtual environment.

In a second aspect of the present disclosure, an apparatus for generating a path of an object through a virtual environment is provided, the apparatus comprising circuitry configured to: receive image data, at a first instance of time, from a plurality of image capture devices arranged in a physical environment; receive image data, at an at least one second instance of time after the first instance of time, from a plurality of image capture devices arranged in the physical environment; detect a location of a plurality of points associated with an object within the image data from each image capture device at the first instance of time and the at least one second instance of time; project the location of the plurality of points associated with the object within the image data from each image capture device at the first instance of time and the at least one second instance of time into a virtual environment to generate a location of the plurality of points associated with the object in the virtual environment at each instance of time; and generate a path of the object through the virtual environment using the location of the plurality of points associated with the object in the virtual environment, the path being indicative of the position and orientation of the object through the virtual environment.

In a third aspect of the present disclosure, a computer program product comprising instructions which, when the program is implemented by a computer, cause the computer to perform a method of generating a path of an object through a virtual environment is provided, the method comprising: receiving image data, at a first instance of time, from a plurality of image capture devices arranged in a physical environment; receiving image data, at an at least one second instance of time after the first instance of time, from a plurality of image capture devices arranged in the physical environment; detecting a location of a plurality of points associated with an object within the image data from each image capture device at the first instance of time and the at least one second instance of time; projecting the location of the plurality of points associated with the object within the image data from each image capture device at the first instance of time and the at least one second instance of time into a virtual environment to generate a location of the plurality of points associated with the object in the virtual environment at each instance of time; and generating a path of the object through the virtual environment using the location of the plurality of points associated with the object in the virtual environment, the path being indicative of the position and orientation of the object through the virtual environment.

According to embodiments of the present disclosure, a path for an object through a virtual environment, based on its movement in a real world environment, can be efficiently and reliably generated. The generated path can be analysed in order to determine additional information regarding the object. Indeed, the generated path may be particularly advantageous when used as for training in order to improve the performance of a physical skill or performance of a physical task.

Of course, the present disclosure is not particularly limited to the aforementioned advantageous technical effects. Other advantageous technical effects will become apparent to the skilled person when reading the disclosure.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
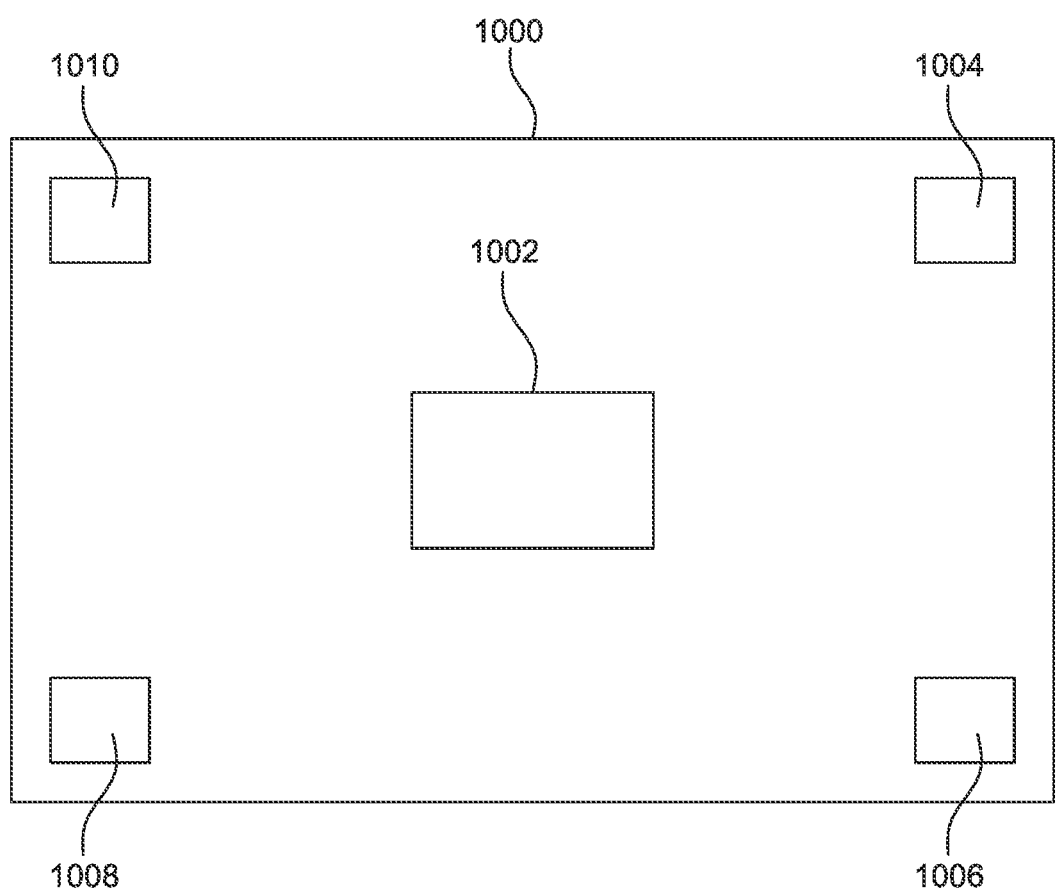
FIG. 1 illustrates an apparatus according to embodiments of the disclosure.

Referring now to the drawings, wherein like reference numerals designate identical or corresponding parts throughout the several views.

Referring to FIG. 1, an apparatus 1000 according to embodiments of the disclosure is shown. Typically, an apparatus 1000 according to embodiments of the disclosure is a computer device such as a personal computer or a terminal connected to a server. Indeed, in embodiments, the apparatus may also be a server. The apparatus 1000 is controlled using a microprocessor or other processing circuitry 1002.

The processing circuitry 1002 may be a microprocessor carrying out computer instructions or may be an Application Specific Integrated Circuit. The computer instructions are stored on storage medium 1004, which may be a magnetically readable medium, optically readable medium or solid-state type circuitry. The storage medium 1004 may be integrated into the apparatus 1000 (as shown) or, alternatively, may be separate to the apparatus 1000 and connected thereto using either a wired or a wireless connection. The computer instructions may be embodied as computer software that contains computer readable code which, when loaded onto the processor circuitry 1002, configures the processor circuitry 1002 to perform a method according to embodiments of the disclosure.

Now, additionally connected to the processor circuitry 1002, is a user input 1006. The user input 1006 may be a touch screen or maybe a mouse or stylist type input device. The user input 1006 may also be a keyboard or any combination of these devices. The user input 1006 may also be configured to receive audio input such as voice instructions or the like.

A network connection 1008 is also coupled to the processor circuitry 1002. The network connection 1008 may be a connection to a Local Area Network or a Wide Area Network such as the Internet or a Virtual Private Network or the like. The network connection 1008 may be connected to external servers or devices allowing the processor circuitry 1002 to communicate with the other servers or devices in order to obtain relevant data or provide relevant data to these other servers or devices. Furthermore, the network connection 1008 may be located behind a firewall or some other form of network security. Indeed, network connection 1008 may be used to perform encrypted communication with a connected device.

Additionally coupled to the processing circuitry 1002, is a display device 1010. The display device, although shown integrated into the apparatus 1000, may additionally be separate to the apparatus 1000 and may be a monitor or some kind of device allowing the user to visualise the operation of the system. In addition, the display device 1010 may be a printer or some other device allowing relevant information generated by the apparatus 1000 to be viewed by the user or by a third party. In fact, apparatus 1000 may be able to output data to a number of display devices 1010 simultaneously.

A more specific configuration of the apparatus 1000 according to embodiments of the disclosure will be described with reference to the following description and drawings.

Figure 2:
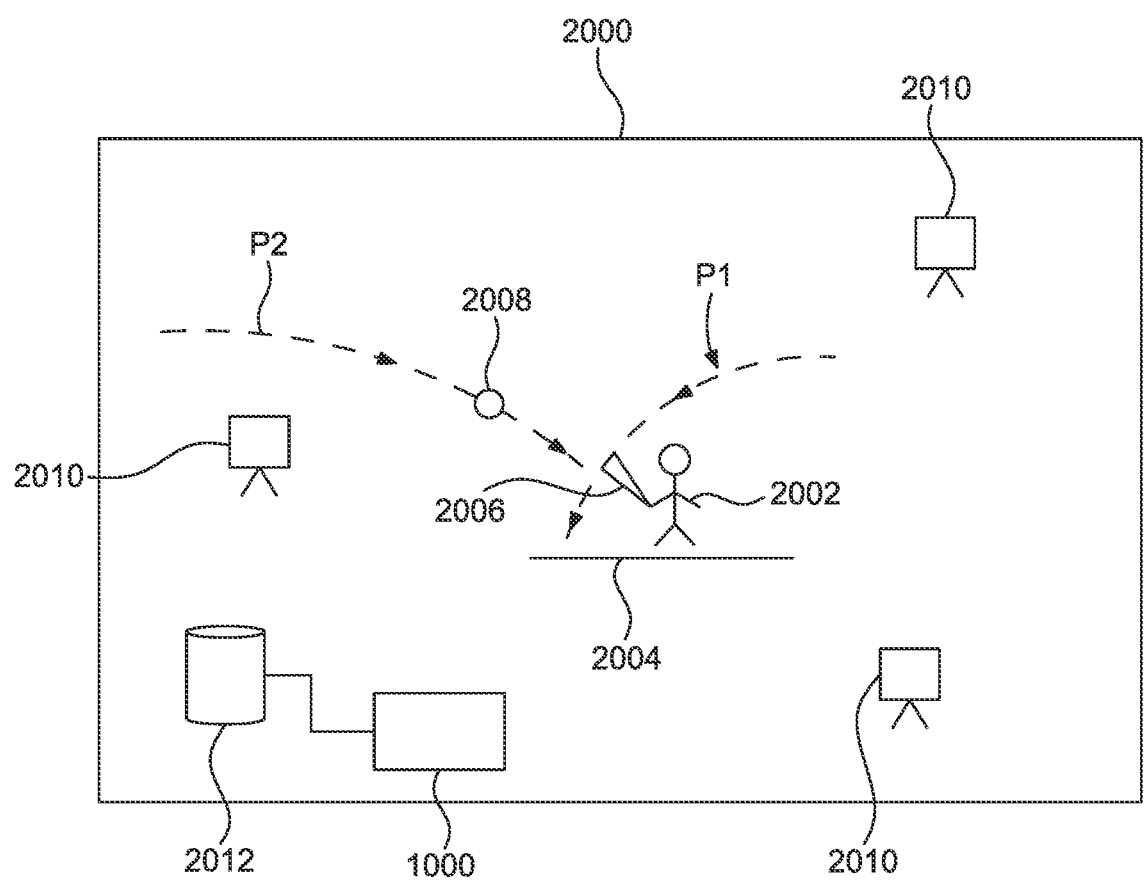
FIG. 2 illustrates an example situation in accordance with embodiments of the disclosure.

Turning now to FIG. 2 of the present disclosure, an example situation in accordance with embodiments of the disclosure is shown. In the example of FIG. 2, a sporting event is illustrated as an example of a type of event in accordance with embodiments of the disclosure. A physical environment 2000 (such as a playing field or playing surface) is shown. Indeed, within this example, the physical environment is a baseball field. A player 2002 stands at a certain location on the playing field 2004. The certain location 2004 is a region of the baseball field such as the batter's box where a player (the batter or batsman) stands when ready to receive a pitch from a pitcher (a player who pitches the ball towards the batter) during the game of baseball. Therefore, in this example, the player 2002 is a batter. Accordingly, the player 2002 (the batter) holds an object 2006, such as a baseball bat, for hitting or striking a ball which has been pitched by a pitcher.

A number of image capture devices 2010 are arranged within the physical environment 2000 (i.e. at different locations on or around the playing field). These image capture devices 2010 capture images of the baseball game for provision to a broadcaster or other content provider. Each of the image capture devices 2010 captures a different view of the baseball game. The image capture devices may be video cameras capable of capturing still or moving images of the baseball game. These images may be high definition images of the baseball game. However, these images may also be of higher resolution such as 4K or 8K images of the baseball game. More generally, the image capture devices 2010 may be capable of capturing an image or series of images of the sporting event at any resolution that is required for a given situation.

In some examples, the field of view from an image capture device 2010 may cover only a portion of the baseball field. For example, an image capture device 2010 may capture an image of a region of the baseball field in which the batter 2002 is located. However, in other examples, the image capture device 2010 may have a much wider field of view, which encompasses a large portion of the baseball field 2000.

Now, as noted above, images captured by image capture devices 2010 may be provided to a television broadcaster who may broadcast those images such that those images can then be viewed by other people with compatible viewing devices. That is, there may be a number of viewers who are watching the player 2002 play the baseball game on their personal televisions and/or computing devices at home, for example. However, in other situations, the images from the image capture devices may be stored in a database such as 2012 where they can be accessed at a later time as required. As such, the images of the baseball game need not be transmitted or broadcast at the time of image capture.

In some examples, the image capture devices 2010 may have a fixed position/location (e.g. a fixed position or location on the baseball field 2000). Alternatively, the image capture devices 2010 may be able to move around the baseball field as the sporting event progresses. Moreover, even when an image capture device 2010 remains at a fixed position within the physical environment 2000, the image capture device 2010 may be able to rotate on its mount/stand in order to change the field of view. More generally, therefore, it will be appreciated that rotational movement of the camera may be possible even if translational movement of the camera is restricted. This may enable the image capture devices to capture images of an increased portion of the physical environment 2000.

Accordingly, while the image capture devices 2010 capture an image or series of images of the baseball game that is being played on the baseball field 2000, the form and type of the image capture devices 2010 are not particularly limited in accordance with embodiments of the disclosure.

Now, in this example, at a certain stage during the baseball game, a pitcher (not shown) pitches (or throws) a baseball 2008 towards the batter 2002. The trajectory the baseball 2008 takes through the physical environment towards the player 2002 is illustrated by the line P2 in FIG. 2 of the present disclosure. At this stage, the batter 2002 swings the baseball bat 2006 in an attempt to hit the baseball 2008. The swing of the baseball bat 2006 is illustrated by the line P1 in FIG. 2 of the present disclosure.

Accordingly, a person (such as a viewer) watching the images captured by image capture devices 2010 may see the player 2002 hitting (or attempting to hit) the baseball 2008 with the baseball bat 2006.

However, it can be difficult for a person watching the images, which have been captured by image capture devices 2010, to understand details of the swing of the baseball bat 2006 and/or details of the interaction between the baseball bat 2006 and the baseball 2008.

For example, when viewing the images captured by the image capture devices 2010, it may appear as though the batter 2002 has performed a good swing of the baseball bat, which should result in a good trajectory of the baseball 2008 after it has been hit by the baseball bat. However, owing to complexities of the interaction between the baseball 2008 and the baseball bat 2006, the batter may have actually not made a good contact with the baseball 2008. Therefore, it can be confusing and frustrating for a person viewing the images captured by the image capture devices 2010 when the trajectory of the baseball 2008 after it has been hit by the baseball bat 2006 is not as good as expected.

Additionally, if the swing of the baseball bat 2006 appears good in the images that have been captured by the image capture devices 2010, it can be difficult for a person (such as a coach or a player) to understand how they can improve their performance within the sporting event when an outcome (e.g. the trajectory of the baseball after contact with the baseball bat 2006) is not as good as expected.

Moreover, since each of the image capture devices 2010 captures an image or stream of images comprising a certain view of the baseball field 2000, when viewing the images from one of these image capture device 2010 it can be difficult to see the swing of the baseball bat 2006. That is, a certain portion of the swing of the baseball bat 2006 may be obscured by other objects (such as the body of the batter 2002 or other players (not shown)) when viewed from one or more of the image capture devices 2010. This can make it difficult to see whether the swing of the baseball bat is good or not in the images which have been captured by image capture devices 2010. Rapid switching between the images captured by the different image capture devices 2010 that are present within the physical environment may lead to some improvement in the view of the swing of the baseball. However, rapid switching between the images of the image capture devices can be confusing and disruptive for a viewer of the images. Moreover, it can make analysis of the image data even more complex and computationally challenging.

As such, there is a desire to be able to reliably analyse the movement of a specific object within an event (such as the baseball game illustrated in FIG. 2) and to be able to provide additional information regarding the event, which can improve analysis and understanding of the event.

Accordingly, in order to address these issues (and the issues described in the Background of the present disclosure), an apparatus for generating a path of an object through a virtual environment is provided in accordance with the present disclosure.

<Apparatus>

Figure 3:
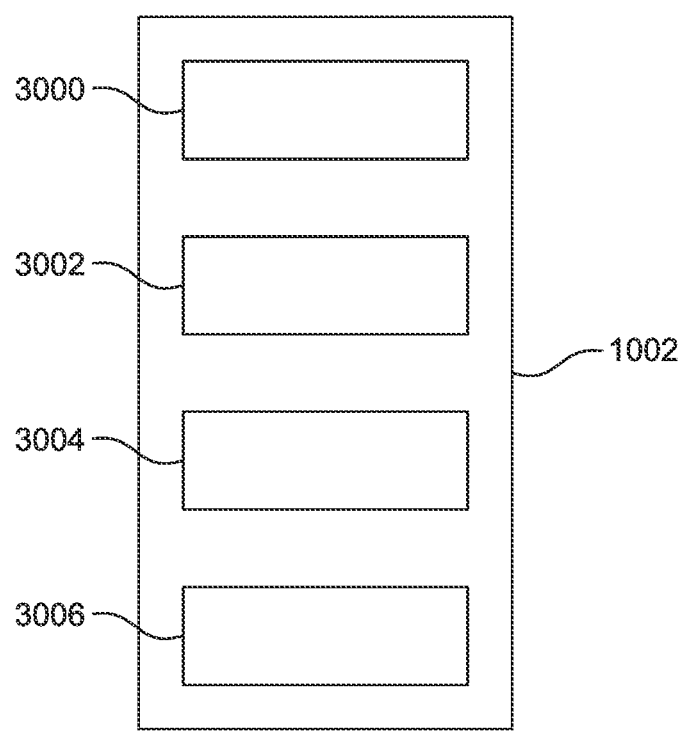
FIG. 3 illustrates an example configuration of an apparatus in accordance with embodiments of the disclosure.

FIG. 3 illustrates a configuration of an apparatus for generating a path of an object through a virtual environment in accordance with embodiments of the disclosure. That is, a specific example configuration of a processing circuitry 1002 (such as that as described with reference to FIG. 1 of the present disclosure) is illustrated. In particular, the processing circuitry 1002 is, in this example, configured as a receiving unit 3000, a detecting unit 3002, a projecting unit 3004 and a generating unit 3006.

According to embodiments of the disclosure, the receiving unit 3000 may be configured to receive image data, at a first instance of time, from a plurality of image capture devices arranged in a physical environment. Furthermore, the receiving unit 3000 may be configured to receive image data, at an at least one second instance of time after the first instance of time, from a plurality of image capture devices arranged in the physical environment. The detecting unit 3002 may be configured to detect a location of a plurality of points associated with an object within the image data from each image capture device at the first instance of time and the at least one second instance of time. Then, the projecting unit 3004 may be configured to project the location of the plurality of points associated with the object within the image data from each image capture device at the first instance of time and the at least one second instance of time into a virtual environment to generate a location of the plurality of points associated with the object in the virtual environment at each instance of time. Finally, the generating unit 3006 of apparatus 1000 may be configured to generate a path of the object through the virtual environment using the location of the plurality of points associated with the object in the virtual environment, the path being indicative of the position and orientation of the object through the virtual environment.

In this manner, apparatus 1000 may efficiently and reliably generate a path for an object through a virtual environment, based on its movement in the real world. The generated path can be analysed in order to determine additional information regarding the object and its movement. This enables additional information, which was not previously available, to be determined regarding the object. Indeed, the generated path, and information determined from the analysis of the generated path, may be particularly advantageous when used as a training device to improve the performance of a physical skill or performance of a physical task.

A more detailed description of the apparatus 1000 in accordance with embodiments of the disclosure will be provided with reference to FIGS. 4 to 10 of the present disclosure.

<Receiving Unit>

As noted above, the receiving unit 3000 of apparatus 1000 is configured to receive images, at a first instance of time and at least one second instance of time, from a plurality of image capture devices arranged in a physical environment. In some examples, the images at the at least one second instance of time may be received from the same image capture devices as the images from the first instance of time. However, in other examples, a different plurality of image capture devices may capture the images at the first and the at least one second instance of time.

Returning now to the example of FIG. 2 of the present disclosure, an apparatus 1000 is illustrated as being present within the physical environment 2000. However, it will be appreciated that the apparatus 1000 need not actually be present at the physical environment 2000 and may, alternatively, be located at some different location (such as at a server side or the like) provided that it is able to receive images from the image capture devices.

Moreover, apparatus 1000 may, in some examples, be communicatively coupled with the image capture devices such that images from the image capture devices are received directly from the image capture devices 2010. Alternatively, the apparatus 1000 may receive the images (or image data) from the image capture devices indirectly (and therefore need not necessarily be communicatively coupled to the image capture devices 2010). That is, as illustrated in the example of FIG. 2 of the present disclosure, the apparatus 1000 may be communicatively coupled with a database or storage unit 2012, which is used to store images from the image capture devices 2010. In this case, the receiving unit 3000 of apparatus 1000 may receive the images captured by the image capture devices 2010 from the storage unit 2012. Such communicative coupling may be implemented by any wired or wireless connection between the apparatus 1000, the image capture devices 2010 and/or the storage unit 2012 (e.g. using network connection 1008, for example).

Therefore, it will be appreciated that the images may be received from the image capture devices 2010 at the time of image capture or, alternatively, may be received at a time after the images have been captured (such as when the images are later retrieved from storage). In this situation, the image data may, itself, be indicative of the time of image capture of each of the images.

In some examples, the apparatus 1000 may continually or periodically receive images of the physical environment from the image capture devices 2010. This may be advantageous as it enables continual or periodic analysis of the physical environment. However, continual or periodic reception of images of the physical environment from the image capture devices 2010 may lead to a significant increase in the storage and/or processing overheads of apparatus 1000. Therefore, optionally, in some examples the apparatus 1000 may be configured to receive images from the plurality of image capture devices 2010 only when a certain trigger event has been determined to have occurred within the physical environment. Detection of the trigger event may be performed or provided by an operator or the like who provides input to indicate that reception of images of the physical environment from the image capture devices 2010 should begin. In other examples, detection of the trigger event may be provided by an additional trigger detection unit (such as an additional processing unit 1002, which monitors a single stream of images (such as images from a single image capture device 2010)). Then, when the predetermined trigger event has been detected, the receiving unit 3000 of apparatus 1000 may be configured to receive images of the physical environment from the image capture devices 2010.

In the example of the baseball game described with reference to FIG. 2 of the present disclosure, the predetermined event may be an event such as the pitcher pitching the baseball to the batter 2002. Then, once the pitch of the baseball has been detected, images can be received from the image capture devices 2010 such that the swing of the baseball bat 2006 can be detected and a path of the baseball bat during the swing can be generated by apparatus 1000. However, the trigger event is not particularly limited to this specific example and any suitable trigger event may be used depending upon when it is desired that the images of the object be received.

Receiving the images from the plurality of image capture devices when a trigger event is detected in this manner may be advantageous as it ensures that images of a certain event may be received from the image capture devices such that the path of an object through the virtual environment can be generated for a certain event, while reducing the total storage and processing requirements of the system.

Now, while three image capture devices 2010 are illustrated in the example of FIG. 2 of the present disclosure, it will be appreciated that the present disclosure is not particularly limited in this regard. That is, the number of image capture devices may be less than that illustrated (e.g. only two image capture devices) or may be significantly more than the number of image capture devices 2010 illustrated in this example (e.g. 10, 20 or significantly more image capture devices). In fact, the method of the present disclosure is not limited to any specific arrangement or set up of the image capture devices, insofar as a plurality of image capture devices are arranged at locations around the physical environment. However, it will be appreciated that, in some examples, once the image capture devices have been arranged at their respective locations within the physical environment, the image capture devices may be calibrated and locked in position. This facilitates comparison of the image captured by the image capture devices over time (by minimising small movements (or wobbles) of the image capture devices between image frames). Alternatively, in some examples, the image capture devices may be re-calibrated each time there is detected movement of the image capture device. This enables comparison of the image data captured by the image capture devices even when there is movement of the image capture devices between image frames.

Figure 4:
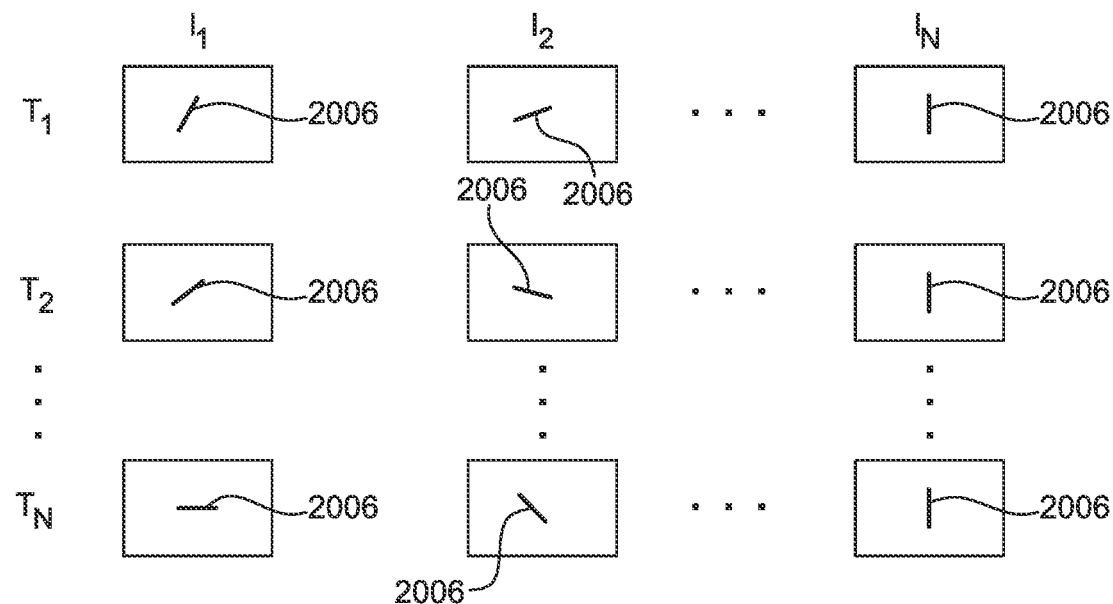
FIG. 4 illustrates an example of a series of images in accordance with embodiments of the disclosure.

Consider now FIG. 4 of the present disclosure. In this example, a series of images as received from a plurality of image capture devices is illustrated. Each of the plurality of image capture devices which captured images in this example is arranged at a certain location in a physical environment (such as the baseball field 2000 described with reference to FIG. 2 of the present disclosure) and captures a view of the physical environment from that location. The swing of an object 2006 (such as the baseball bat 2006) by a player (not shown in FIG. 4) is captured within this stream of images.

Specifically, in this example, images in column $I_1$ are images from a first image capture device, images in column $I_2$ are images from a second image capture device, and images in column $I_N$ are images from an Nth image capture device arranged in the physical environment. Any number of image capture devices may be included between the second image capture device and the Nth image capture device.

Furthermore, images in row $T_1$ are images of the physical environment 2000 at a first instance of time, images in row $T_2$ are images of the physical environment 2000 at a second instance of time and images in row $T_N$ are images of the physical environment 2000 which are received at an Nth instance of time. Again, any number of instances of time may be included between the second instance of time and the Nth instance of time. In some examples, the Nth instance of time (or indeed any instance of time occurring after the second instance of time) may also be referred to as a second instance of time as they occur after the first instance of time.

As noted above, within each of the images illustrated in FIG. 4, an object 2006 is shown. This may be a baseball bat as described with reference to FIG. 2 of the present disclosure, for example.

Now, as can be seen at time $T_1$, the baseball bat 2006 appears be located at a different position within the images $I_1$, $I_2$, and $I_N$. This difference is because each of the images $I_1$, $I_2$ and $I_N$ have been captured by an image capture device which is arranged at a different location within the physical environment at the first instance of time. That is, the difference in appearance between images $I_1$, $I_2$, and $I_N$ is because these images comprise a different respective view of the baseball bat 2006 at the first instance of time.

Then, at the second instance of time T2, the baseball bat 2006 appears to have moved to a different location within each of the images captured by image capture device $I_1$, $I_2$ and $I_N$ respectively when compared to the location of the baseball bat in the images captured by those image capture devices at the first instance of time T1. This is because the second time is an instance of time after the first instance of time and therefore shows the baseball bat at during a later stage of the swing.

Specifically, a relative motion of the baseball bat 2006 can be seen between the image captured by the first image capture device at the first instance of time and the image captured by the first image capture device at the second instance of time. Furthermore, relative motion between the image captured by the first image capture device at the second instance of time and the image captured by the first image capture device at the Nth instance of time (which is later than the second instance of time) can also be seen. Therefore, by comparing the images from a single image capture device as captured at a different instance of time the movement of the baseball bat over time through the physical environment can be seen.

However, as noted above, the images from a single image capture device (such as the first image capture device) show the movement of the baseball bat over time through the physical environment from only a single location and therefore provide only a single view of the movement of the baseball bat through the physical environment. Therefore, by inspecting images from only a single image capture device, it can be difficult to fully understand the movement of the baseball bat through the physical environment, since movement of the baseball bat occurs in the three-dimensional physical real world environment. In particular, movement of the baseball bat in a depth direction (i.e. on an axis towards or away from the image capture device) can be difficult to observe in images from a single image capture device. Moreover, at some instances of time, the view of the baseball bat in images from a single image capture device may be obscured (owing to an obstruction by the body of a player, for example). Therefore, it may not be possible to see the baseball bat 2006 in all images which have been received from a single image capture device.

However, as noted above, the second image capture device and the Nth image capture device capture images of the baseball bat 2006 within the physical environment 2000 from a different location in the physical environment to that of the first image capture device (and to each other) and therefore provide different views of the movement of the baseball bat 2006 over time. Movement of the baseball bat which is not visible in the images received from the first image capture device (e.g. movement on an axis towards or away from the first image capture device) may be visible in the images from the second image capture device $I_2$ and/or the Nth image capture device $I_N$. Conversely, movement of the baseball bat 2006 which can be seen in the images from the first image capture device $I_1$ may not be visible in the images from the second image capture device $I_2$ and/or the Nth image capture device $I_N$.

In other words, each of the image capture devices is arranged at a different/unique location in the physical environment, such that the images received from a single image capture device provide a unique time-series view of the movement of the baseball bat 2006 through the physical environment during the sporting event.

Now, it will be appreciated that the format of the image data, which is received from the image capture devices by receiving unit 3000, is not particularly limited. That is, the form of the image data that is received will depend, at least in part, on the type of image capture device which is used in order to capture the images of the physical environment. For example, the image data may be a RAW image file comprising unprocessed data from the image capture devices. However, in other examples, the image data that is received from the image capture devices may have undergone an amount of image processing prior to being received by the receiving unit. This image processing may be performed by the image capture devices and/or a server prior to reception by the receiving unit. In this situation, any other type of format of the image data may be used (including image formats such as a JPEG, BMP or PNG file, for example). Indeed, the image data is not particularly limited in accordance with embodiments of the disclosure.

In this manner, the receiving unit 3000 is configured to receive images from the plurality of image capture devices 2010.

<Detecting Unit>

Once the images have been received by the receiving unit 3000, the detecting unit 3002 of apparatus 1000 is configured to detect the location of a plurality of points associated with an object within the image data from each image capture device at the first instance of time and the at least one second instance of time. That is, even though (as described with reference to FIG. 4 of the present disclosure) the images from the image capture devices provide a unique view of the physical environment (such as the baseball field 2000) the location of a specific object (such as the baseball bat 2006) within these images may not be known to apparatus 1000. Accordingly, the detecting unit 3002 is configured to detect, through object detection, the location of the specific object (such as the baseball bat 2006) within each of the images which has been received through the detection of a plurality of points associated with the object.

Figure 5A:
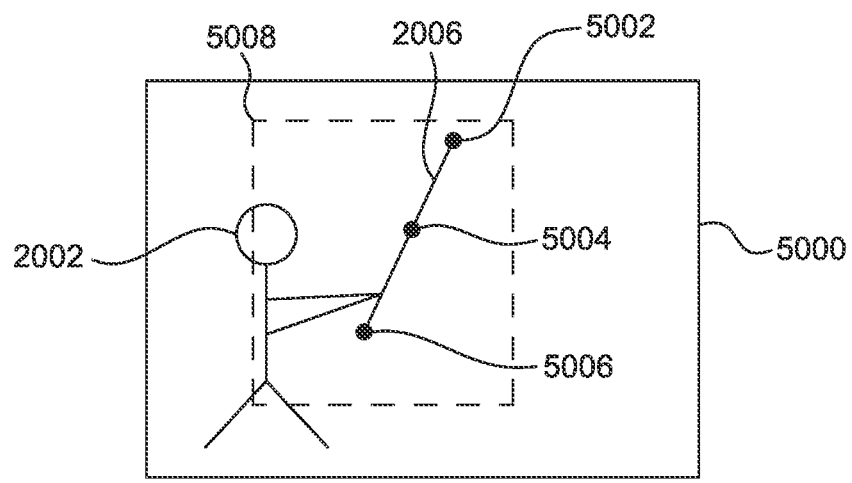
FIG. 5A illustrates an example of detecting points associated with an object in accordance with embodiments of the disclosure.

Consider now the example of FIG. 5A of the present disclosure. FIG. 5A illustrates an example of detecting points associated with an object in accordance with embodiments of the disclosure.

In this example, an image 5000 is shown. This image an image which has been received from an image capture device 2010 (such as the first image capture device $I_1$ described with reference to FIG. 4 of the present disclosure) at a certain instance of time (such as the first instance of time $T_1$ described with reference to FIG. 4 of the present disclosure). The image 5000 provides a unique view of the physical environment 2000 at the time of image capture. Within this image, a person 2002 (e.g. the batter as described with reference to FIG. 2 of the present disclosure) and an object 2006 (e.g. the baseball bat as described with reference to FIG. 2 of the present disclosure) can be seen.

According to embodiments of the disclosure, detecting unit 3002 is configured to detect the location of a plurality of points associated with the baseball bat 2006 within the image 5000 in order to detect the location of the baseball bat 2006 within the image 5000. Each of the plurality of points may correspond to a number of predetermined distinguishable regions on the object (i.e. key points on the object). That is, a given object (such as a baseball bat) has several regions which are uniquely distinguishable from other regions on that object. These uniquely distinguishable regions of the object may be selected in advance (i.e. when it is determined that the detecting unit 3002 should detect the baseball bat in the series of images received from the image capture devices). The detecting unit 3002 then detects the plurality of points within the image in order to detect the location of the object within the image.

For example, when the object is a baseball bat 2006, the plurality of points associated with the object may, optionally, include at least a point on the distal portion of the bat (i.e. the top of the baseball bat) and a point located between the distal portion of the bat and a proximal portion of the bat (i.e. the handle of the bat). Indeed, the point located between the head of the baseball bat and the handle of the baseball bat may be a uniquely identifiable point on the barrel of the baseball bat, for example.

Using a plurality of points associated with the object in order to detect the location of the object within the image is particularly advantageous, since a number of the plurality of points may be used in order to locate the object even if a number of the other plurality of points are not visible in a certain image. This improves the accuracy of identification of the object. Indeed, instead of locating and detecting the object as a whole, the detecting unit of the present disclosure detects a number of individual discreet points on the object.

In the example of FIG. 5A of the present disclosure, a first point 5002 associated with the top (or cap) of the baseball bat 2006 is detected by the detecting unit. Moreover, a second point 5004 associated with a point on the barrel of the baseball bat 2006 is detected by the detecting unit 3002. Finally, a point 5006 at the handle of the baseball bat 2006 is detected by the detecting unit 3002.

While only a single image 5000 is shown in FIG. 5A, it will be appreciated that the detecting unit 3002 is configured to detect (or attempt to detect) the plurality of points associated with the object in each of the images (or individual image data) which have been received. This includes the images received from each image capture device (i.e. the first and second image capture device) and the images received at all instances of time (i.e. the first and second instance of time).

Moreover, while only three points associated with the object 2006 are shown in FIG. 5A, it will be appreciated that the present disclosure is not particularly limited in this regard. Any number of points may actually be used in order to detect the location of the object within the images, provided that at least a plurality of points associated with the object are detected by the detecting unit 3002.

In some examples, the detecting unit 3002 may be configured to detect the location of the plurality of points associated with the object within the image data through image processing techniques such as template based matching of an image of the respective points associated with the object to the image data.

In other examples, the detecting unit 3002 may be configured to detect the location of the plurality of points associated with the object using a trained model to identify the object and/or the plurality of points associated with the object within the image data. The trained model may be a machine learning or deep learning model, or a neural network, for example. In other examples, a Haar feature based cascade machine learning object detection algorithm may be used, for example.

Figure 6:
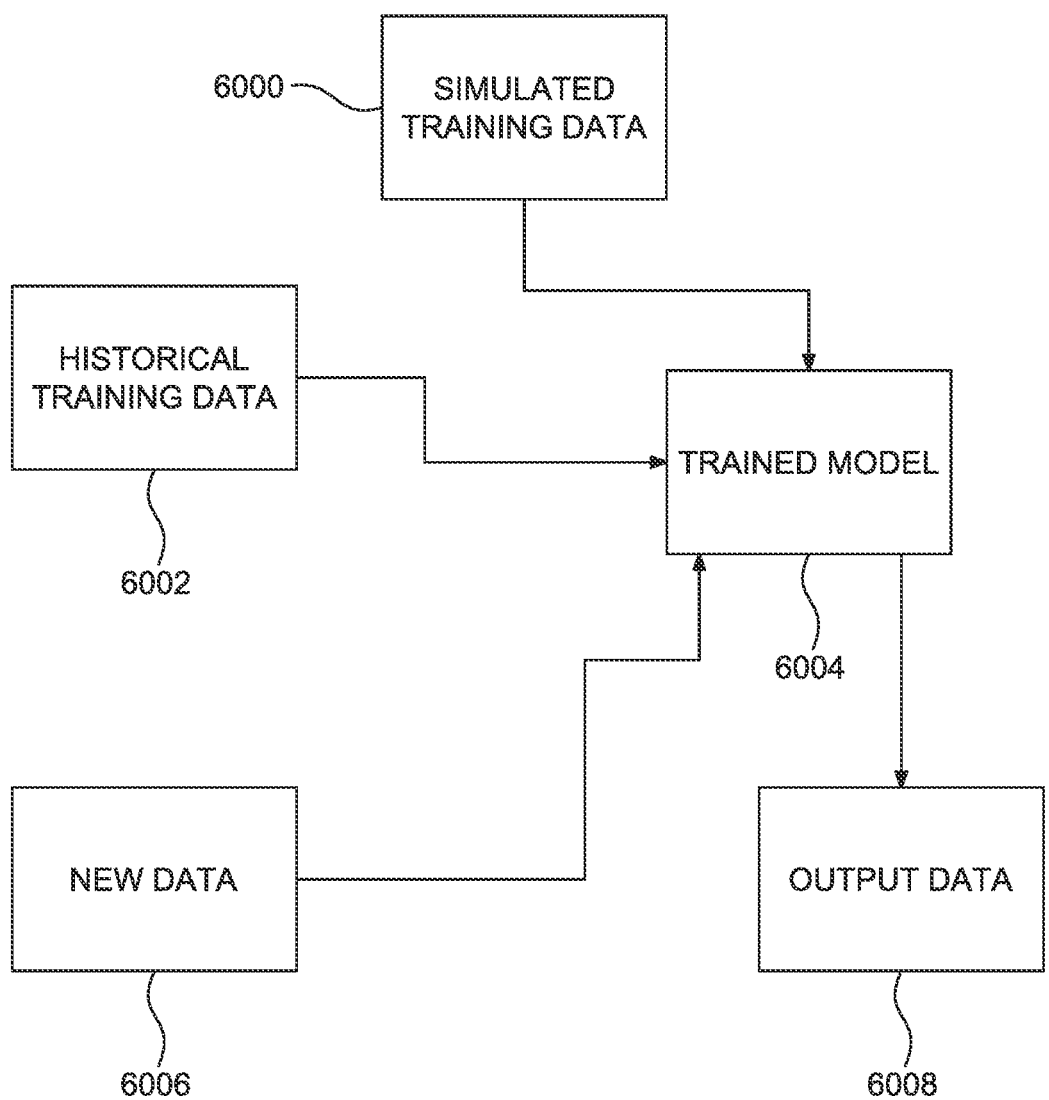
FIG. 6 illustrates an example of training a model in accordance with embodiments of the disclosure.

An example method of training a model to identify the location of the plurality of points associated with the object is illustrated in FIG. 6 of the present disclosure. However, it will be appreciated that the example of FIG. 6 is merely one example of a method of training a model to identify the location of the plurality of points associated with the object which can be used in accordance with the embodiments of the disclosure.

In this example, training data 6000 and 6002 are shown. The training data 6000 and 6002 include images of the object (e.g. the baseball bat 2006) which can be used to train the model to be trained. The training data may include a large dataset of images of baseball bats (either baseball bats in general and/or the specific baseball bat for which detection is desired). These images may show the baseball bat in isolation and/or show images of the baseball bat at a variety of locations and positions in a game of baseball.

Specifically, the training data 6000 comprises simulated training data, which may include artificially generated images of the baseball bat 2006, for example. Use of simulated training data may increase the volume of data which is available and which can be used in order to train the model. In contrast, training data 6002 comprises historical training data, which may include video data of the target object obtained from previous sporting events (such as previous games of baseball). The training data 6000 and 6002 therefore provide the model to be trained with examples of the target object (such as the baseball bat 2006 and/or the points on the baseball bat 2006).

The model 6004 (such as a neural network) is then configured to use the training examples provided in the training data 6000A and 6000B in a training phase in order to learn how to identify instances of the object (or the points associated with the object) in the image data. Specifically, the neural network as may be implemented in accordance with embodiments of the disclosure may be constructed of an input layer, an output layer and a number of 'hidden' layers therebetween. Each of these layers may include a number of distinct nodes. The nodes of the input layer are each connected to the nodes of the first hidden layer. The nodes of the first hidden layer are then connected to the nodes of the following hidden layer or, in the event that there are no further hidden layers, the output layer. However, while, in this specific example, the nodes of the input layer are described as each being connected to the nodes of the first hidden layer, it will be appreciated that the present disclosure is not particularly limited in this regard. Indeed, other types of neural networks (such as convolutional neural networks) may be used in accordance with embodiments of the disclosure as desired depending on the situation to which embodiments of the disclosure are applied. Use of convolutional neural networks may be particularly advantageous when performing image recognition an classification (such as when identifying a number of points associated with the object in an image, for example).

The nodes each take a number of inputs and produce an output based on those inputs. The inputs of each node have individual weights applied to them. The inputs (such as input images of the baseball bat 2006) are then processed by the hidden layers using weights, which are adjusted during training. The output layer produces a prediction from the neural network (which varies depending on the input that was provided).

In examples, during training, adjustment of the weights of the nodes of the neural network is achieved through linear regression models. However, in other examples, logistic regression can be used during training. Basically, training of the neural network is achieved by adjusting the weights of the nodes of the neural network in order to identify the weighting factors which, for the training input data provided, produce the best match to the actual location of the object in the training data (i.e. the images of the baseball bat and/or each of the points associated with the baseball bat).

In other words, during training, both the inputs and target outputs of the neural network may be provided to the model to be trained. The model then processes the inputs and compares the resulting output against the target data (i.e. the known location of the baseball bat (or the points of the baseball bat thereof) in the images). Differences between the output and the target data are then propagated back through the neural network, causing the neural network to adjust the weights of the respective nodes of the neural network.

However, in other examples, training can be achieved without the outputs, using constraints of the system during the optimization process.

Once trained, new input data 6006 can then be provided to the input layer of trained model 6004, which will cause the trained model 6004 to generate (on the basis of the weights applied to each of the nodes of the neural network during training) a predicted output for the given input data (being a prediction of the location of the baseball bat 2006 and/or the plurality of points associated with the baseball bat). In examples, the new data 6006 is the image data received from the image capture devices as described with reference to FIG. 4 of the present disclosure.

The prediction of the location of the object within the image data which is produced by the trained model 6004 may be provided as output 6008. This may be of the form of an image upon which the location of the object is indicated. Indeed, the output 6008 may comprise a heat map indicating the probability of the object (or the points associated with the object) occupying a certain portion of the image. The heat map may therefore provide confidence intervals on the detection of the object (or the points associated with the object) in the image data 6006. In other examples, the output 6008 may comprise data indicative of the location of the object within the image data 6006 (such as image coordinates of the object within the image, for example).

It will be appreciated that the specifics of the model, such as the number of layers or the numbers of nodes in each layer, will vary in accordance with the situation to which embodiments of the present disclosure are applied. Moreover, the number of training images used will vary depending on the requirements of the situation and the performance of the trained model during testing.

Moreover, the model of the object which is produced (i.e. the trained model 6004) may be continually retrained as new images 6006 of the object are received. That is, once the object has been identified within the new image, the new image may be used in combination with the training data 6000A and 6000B to retrain the trained model 6004 as required. In fact, once analysed, the new data 6006 may be included in the historical training data 6002 for use in future training.

In some examples, the training data may be efficiently enhanced by collecting data using discrepancies between the three-dimensional swing and three-dimensional positions of the object. That is, in some examples it is possible to construct a three-dimensional model of the swing even if a portion of the positions are missing. This may be, for example, in cases where the approximate positions of the missing object are sufficiently accurate to collect training examples (current failure cases). In other examples, failure to detect an object within two-dimensional image data may be rectified by projecting a three-dimensional model of the bat (or points from the three-dimensional swing) back into the images where those cameras have failed to successfully contribute in order to further enhance the training.

Furthermore, as described above, it will be appreciated that the mechanism used to detect the location of the object in the images is not particularly limited to the above examples. Rather, any such method may be used to detect the location of the object (or the points associated with the object) as required depending on the situation to which the embodiments of the present disclosure are applied.

It will be appreciated that, in some examples, it may be computationally expensive to use the trained model in order to detect the location of the points associated with an object in the image data which is received from the image capture devices. That is, it may be computationally expensive to detect the location of the plurality of points in each of the images which are received when a large number of images are received for example (e.g. when there are a large number of image capture devices). Therefore, in some examples, initial object recognition software may be used in order to first locate a region of the image received from the image capture device in which the object is located. Such object recognition software enables the identification of the location of a known object in an image. This may include template based object recognition, where a small target image of an object is used in order to find corresponding objects in a larger image. Then, once the region containing the object has been located, the trained model may be used in order to more accurately and reliably detect the location of points associated with the object in the region of the image data.

In other words, in certain examples of the disclosure, initial object recognition is used in order to find a bounding box for individual instances of the object within the image (such as individual instances of the bat within the image). Then, once a bounding box has been created for the individual instances of the object in the image, the plurality of points associated with the object are detected using the portion of the image data contained in the bounding box (i.e. key point detection is performed on the bounding box of the object in the image).

This may reduce the computational demands when detecting the location of the points associated with an object in the image data, since the trained model is only applied to a small portion of the original image data. Moreover, use of the initial object recognition to create a bounding box for the object prior to detection of the plurality of points associated with the object improves the accuracy and reliability of the detection, thus improving the performance of the detecting unit 3002 and apparatus 1000.

Consider, again, the example of FIG. 5A of the present disclosure. In this example, the image 5000 is received from an image capture device 2010 at a first instance of time. The image 5000, in this example, is quite a large image. Therefore, it can be computationally expensive to detect the location of the plurality of points 5002, 5004 and 5006 within the image 5000. However, according to embodiments of the disclosure, a portion 5008 of the image 5000 is first identified as a portion of the image 5000, which contains the object 2006. This may be determined using template based object recognition, for example. Alternatively, the portion 5008 may be identified based on information regarding the location of object 2006 in previous images that have been received. Then, once this portion 5008 has been identified, the trained model can be used in order to detect the location of the plurality of points 5002, 5004 and 5006 within the portion 5008. This provides an efficient process for the detection of the plurality of points within the image 5000.

Hence, in examples, the detecting unit 3002 may be configured to determine a portion of the image data comprising the object; and to detect the location of the plurality of points associated with the object using the portion of the image data which has been determined.

Figure 5B:
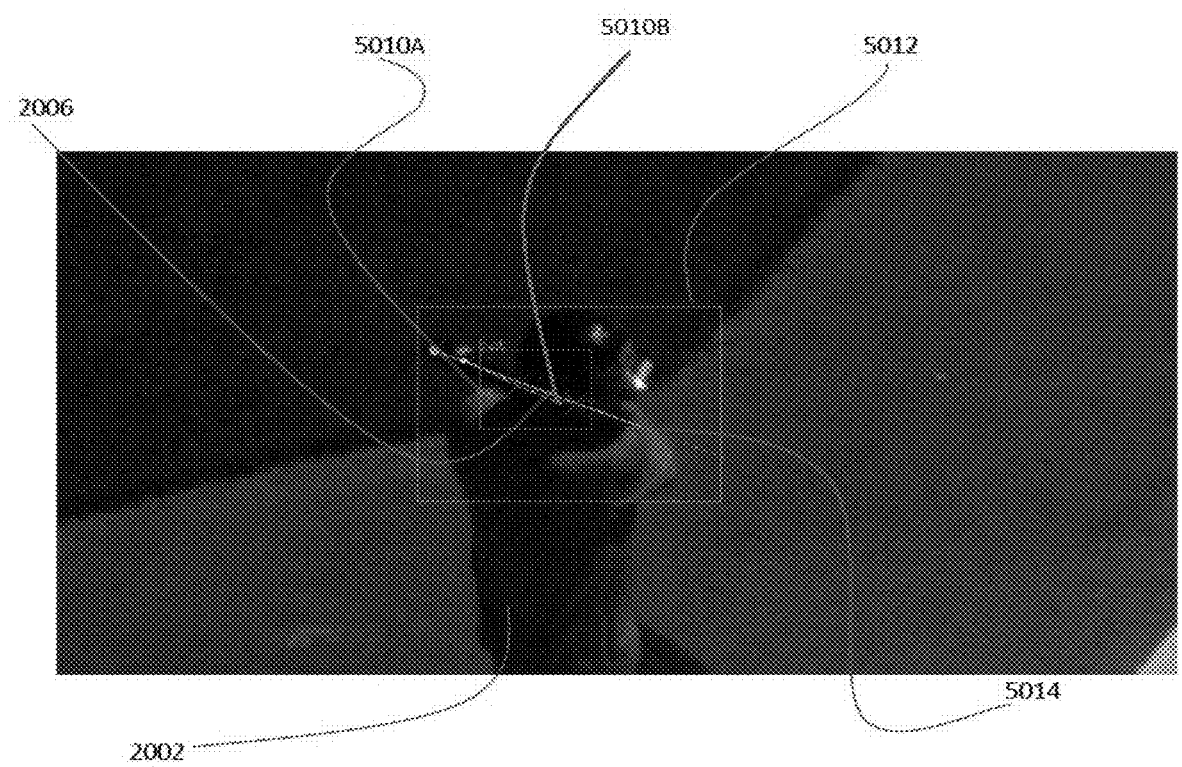
FIG. 5B illustrates an example of detecting points associated with an object in accordance with embodiments of the disclosure.

Consider now FIG. 5B of the present disclosure. In this example, an image as captured by an image capture device 2010 at a certain instance of time during a game of baseball is shown. That is, FIG. 5B illustrates an example of detecting points associated with an object in accordance with embodiments of the disclosure.

In the image shown in FIG. 5B, a batter 2002 is shown holding a baseball bat 2006. However, owing to the posture position or stance of the batter 2002 in this image, it is difficult to see the position of the baseball bat 2006 within this image. Indeed, initial detection of the points associated with the object performed in portion 5010A (being a region in which it is initially detected that the baseball bat is located) leads only to the detection of points 5010B as illustrated in FIG. 5B. However, since image data (not shown) received from other image capture devices 2010 provides image data of the batter 2002 and baseball bat 2006 taken at the same instance of time from a different angle of the batter 2002 and baseball bat 2006, it may be that the baseball bat 2006 is more easily visible in the image from one or more of the other image capture devices. That is, an increased number of the points associated with the baseball bat 2006 may be detectable or detected in the images received from one or more of the other image capture devices at that instance of time (corresponding to different views of the object). As such, according to embodiments of the disclosure, the detection of the plurality of points in the images from one or more of the other image capture devices may be used in order to improve the detection of the plurality of points in an image in which at least a portion of the plurality of points could not be detected.

Specifically, according to embodiments of the disclosure, the apparatus 1000 may be configured to triangulate the location of the plurality of points associated with an object (such as the baseball bat 2006) across the image data in which the plurality of points could be detected (such as the image data from the one or more of the other image capture devices) to project the plurality of points into the virtual environment (described in more detail below). Then, apparatus 1000 may be configured to generate a three-dimensional bounding box for the object enclosing the plurality of points within the virtual environment. This can be performed by any suitable method such as the use of minimum bounding box algorithms, for example. The three-dimensional bounding box may then be used in order to re-define a portion of the image data in which the object is located for the image data in which the plurality of points could not be detected. The box 5012 shown in FIG. 5B is an example of a re-defined portion of the image data in which the object 2006 (i.e. the baseball bat) is located for the image data in which the plurality of points could not be detected. In some examples, the three-dimensional bounding box may be a cube. However, in other examples (where the shape of the bat is known (from prior information and/or a model of the bat, for example)) the method may comprise projecting the shape of the bat into the image (to obtain a two-dimensional bat outline in the image data) from which an axis-aligned bounding box can be determined (being the smallest box which fits around the bat in the image data). This may be particularly advantageous when redefining a portion of the image for detection of points, when the shape of the bat is known.

As seen in FIG. 5B, the re-defined portion of the image data 5012 (generated using information of the plurality of points as detected in images from other image capture devices at the same instance of time) defines a larger bounding box than the portion of the image data 5010 which was originally used in order to detect the object 2006. Parts of the baseball bat 2006 which extend beyond the original portion of the image data 5010 (set based on the image shown in FIG. 5B alone) are included in the re-defined portion of the image data (set based on the detection of points in images received from other image capture devices at the same instance of time). Therefore, in this situation, the re-defined portion of the image data provides an improved and more accurate portion of the image in which the object 2006 is located.

Finally, the detecting unit 3002 may be configured to detect a location of the plurality of points associated with the object within the image data in which the plurality of points could not be detected using the re-defined portion of the image data. Certain points associated with the baseball bat 2006 which were not detected when using the original portion of the image 5010 may therefore be detected by the detecting unit 3002.

As such, according to embodiments of the disclosure, information regarding the plurality of points as detected in images from one or more other image capture devices may be used in order to improve the detection of the plurality of points in image data from an image capture device in which it is more difficult to detect the plurality of points.

Figure 7:
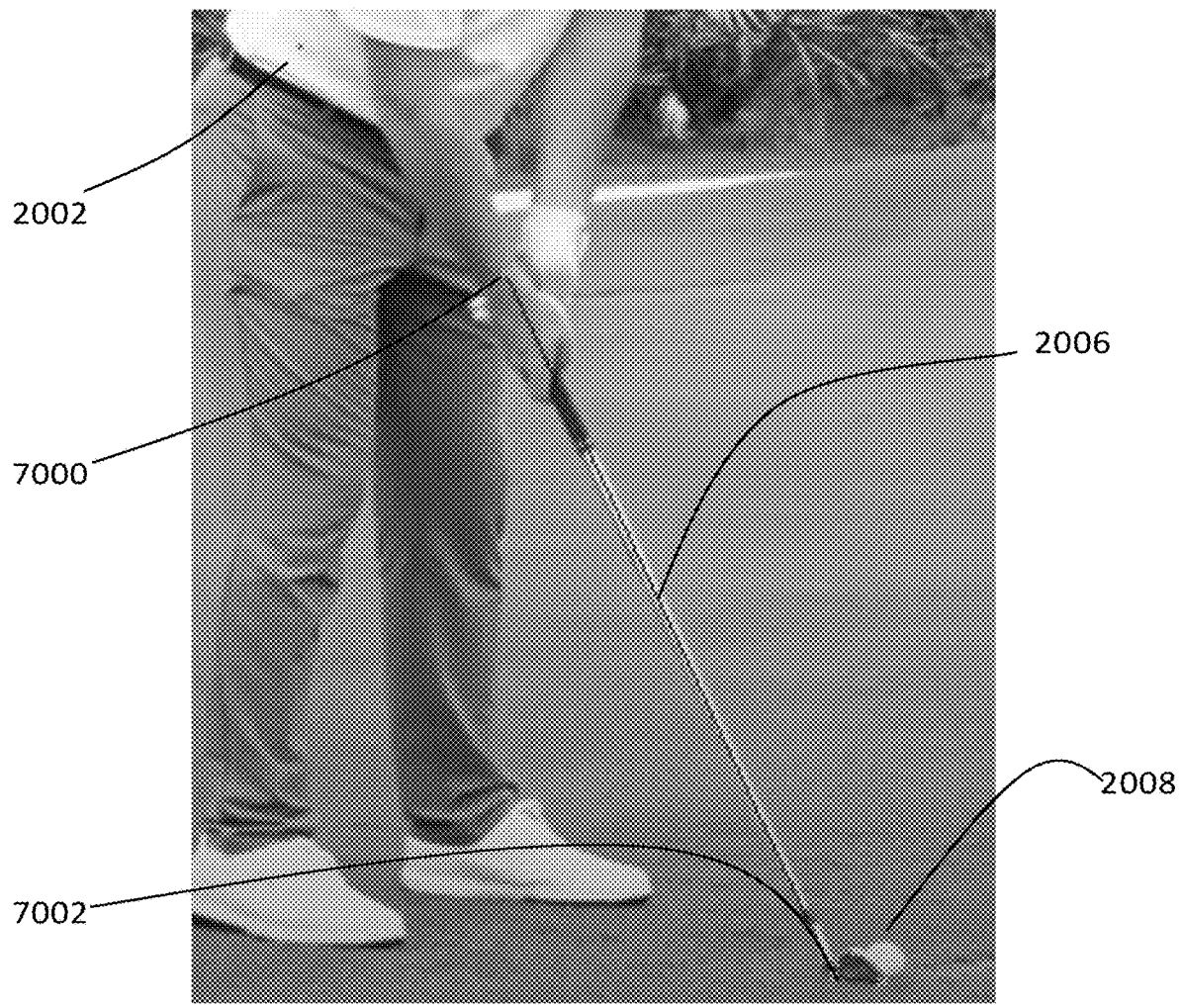
FIG. 7 illustrates an example of detecting points associated with an object in accordance with embodiments of the disclosure.

Turning now to FIG. 7 of the present disclosure, an example of detecting points associated with an object in accordance with embodiments of the disclosure is illustrated. In the example image illustrated in FIG. 7, a player 2002 is shown. The player is holding an object 2006 (in this example, a golf club) which they are going to use in order to hit an object 2008 (in this example, a golf ball). The image illustrated in FIG. 7 may be an image received from an image capture device 2010 at a first instance of time, for example.

In this example, a number of points associated with the object 7002 have been detected by the detecting unit 3002 in the image data. These points are located at the head of the golf club 2008 as is illustrated in FIG. 7. Moreover, a number of points (not illustrated) on the shaft of the golf club may also be detected or detectable by the detecting unit 3002.

However, because the player is holding the gold club, the handle of the golf club cannot be seen in the image illustrated in FIG. 7. Nevertheless, it may be desirable that the location of a point associated with the handle of the golf club is detected within the image to improve subsequent comparison of the points in this image with points in a second image at the same instance of time (i.e. from a different angle of view) where the point associated with the handle is visible.

Accordingly, in some examples, when the proximal portion of the object (such as the handle of the golf club) is not detectable in the image data, the detecting unit 3002 may further be configured to determine a location of the proximal portion of the object by projecting a line, using the orientation of the object, from the distal portion of the object (such as the head of the golf club), wherein a property of the line is determined using a model of the object.

Specifically, since points at the head of the golf club 7002 can be detected and a number of points on the shaft of the golf club have also been detected, the orientation of the golf club within the image shown in FIG. 7 of the present disclosure can be determined by the detecting unit 3002. Using the orientation of the golf club, the detecting unit 3002 can project a line from the head of the golf club 7002 along the shaft of the club towards the handle. A property, such as the length or size of the golf club, which can be determined using a model of the object (with the model of the object being the trained model of the object, or an independent model of the object describing properties of the object, for example). This property, such as the length or size of the golf club, coupled with information regarding the orientation of the golf club and the location of the points 7002 at the head of the golf club 2006, enables the detecting unit 3002 to determine an estimated location of the points 7000 at the handle of the golf club 2006 within the image shown in FIG. 7 of the present disclosure.

Therefore, even when a certain point associated with the object cannot be detected within an image received from the image capture devices, an estimated location of that point can be determined as described above. This may further improve the reliability of the detecting unit 3002 in detecting the location of the points associated with the object in the image data that has been received. Furthermore, determining an estimated location of a point of the plurality of points in this manner may further improve comparison between the points as detected by other image capture devices at the same instance of time when generating the path of the object as described in more detail below.

However, in other examples, the detecting unit 3002 may detect the location of a point, corresponding to a portion of the object, within the image data even when the point is, itself, obscured within the image data. That is, the detecting unit may detect (or estimate) an approximate location of a point within the image data when that point is obscured (this may be based upon the known locations of other key points within the image data, for example). The approximate location of the point which has then been determined may then be treated as a less robust contribution to the generation of the three-dimensional path of the object (e.g. a greater weighting value may be applied to points which are detected and not obscured within the image data). The level of contribution applied to the detected point may also vary in accordance with the type of point which has been detected (e.g. whether it corresponds to the head or the handle of the bat, for example).

In this manner, the detecting unit 3002 detects the location of the plurality of points associated with the object in the image data which is received from the image capture devices.

<Projection Unit>

Once the plurality of points associated with the object have been detected in the image data received from the image capture devices, the projecting unit 3004 of apparatus 1000 is configured to project the plurality of points into a virtual environment to generate a location of the plurality of points associated with the object in the virtual environment at each instance of time.

In the present disclosure, a virtual environment is a space that replicates the physical environment captured in the images from the image capture environment. That is, the virtual environment is a three-dimensional virtual space replicating the physical environment which can, optionally, be manipulated and controlled by user input (e.g. rotated, panned, zoomed or the like). Indeed, the virtual environment is a simulation of a physical space in which virtual objects can be placed at given coordinates within the virtual space. The simulated data controlling and defining the virtual environment is stored in a storage (such as storage medium 1004 and/or storage unit 2012). Optionally, at least a portion of the virtual environment may be displayed or rendered on a display for presentation to a user. This may be performed by display device 1010 of apparatus 1000, for example, and is described in more detail below.

As previously explained, each image capture device 2010 captures images of the physical environment (and images of objects within that physical environment) from a certain location depending on the arrangement of the image capture devices around and within the physical environment. As such, each image capture device 2010 captures a unique view or perspective of the scene at any given instance of time. Therefore, an object within the virtual environment will appear at a different angle or position within images from a first image capture device (at a first location in the physical environment) to as it appears within images captured by a second image capture device (at a second location in the physical environment). Nevertheless, despite the different appearance of the position and orientation of the object within images from the different image capture devices, it will be appreciated that there is actual only one physical location of a given object within the physical environment at a given instance in time. The difference in appearance between the position and orientation of the object within the images as received from the different image capture devices at any given instance of time is due to the different location of those image capture devices around or within the physical environment.

Additionally, the location of the image capture devices in the physical environment (i.e. how those image capture devices are arranged within the physical environment) is known. This may be because the image capture devices are established at predetermined locations within the physical environment. Alternatively, this may be because the image capture devices report their respective location within the physical environment at the time at which the images are captured. In this situation, the location of the image capture device within the physical environment may be determined by a system such as a GPS system or the like, while the information indicative of the location of the image capture device in the physical environment may be recorded as certain metadata information with the image data captured by the image capture device.

Accordingly, based on the images of the object in the physical environment which capture a different perspective of the object within the physical environment and the location of the respective image capture devices 2010 within the physical environment at the time of image capture, the projecting unit 3004 of apparatus 1000 is able to triangulate and combine the plurality of points associated with the object which have been detected by the detecting unit 3002 across the images at a given instance of time in order to determine the actual location of each of the plurality of points within the physical environment.

That is, for each of the plurality of points which have been detected by the detecting unit 3002, a single location of that point within the physical environment can be determined for each instance of time from the images received from the image capture devices. The projecting unit may then project the locations of these points into a virtual environment as described above in order to create a three-dimensional representation of the location of each of the plurality of points through the virtual environment (representing the motion of the object through the physical environment at each instance of time). As such, in some examples, projection of the points into the virtual environment by the projection unit 3004 may be performed by a triangulation of the points which have been detected by the detected by the detecting unit 3002. However, in other examples, any suitable method for mapping the positions of the plurality of points into the virtual environment may be performed by the projecting unit 3002 as required.

Figure 8:
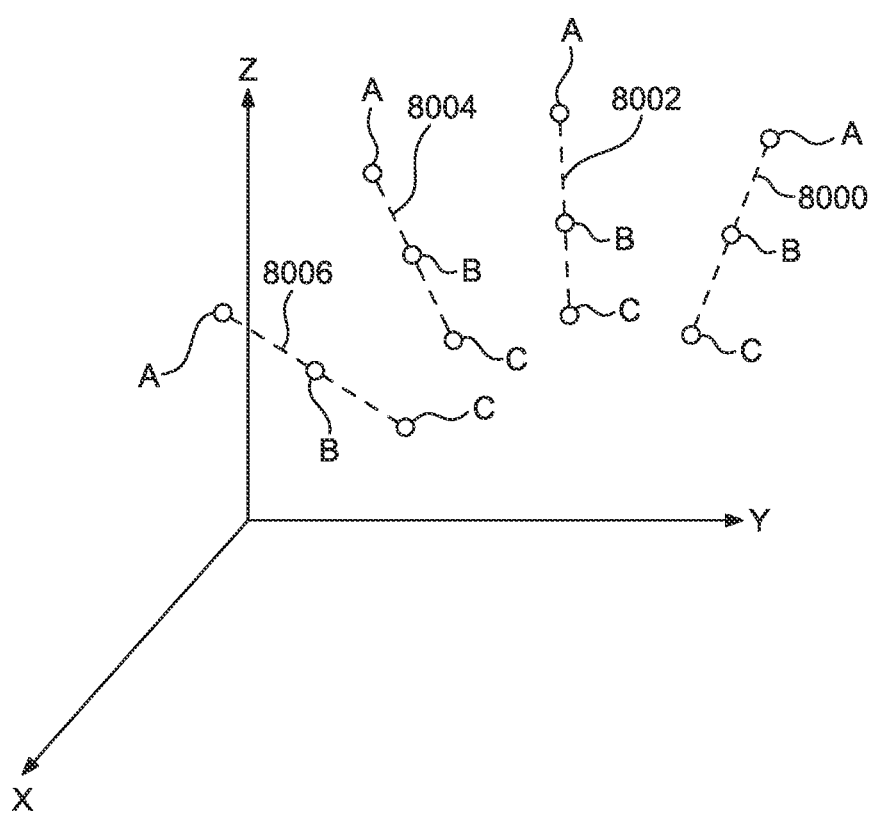
FIG. 8 illustrates an example of projecting detected points into a virtual environment in accordance with embodiments of the disclosure.

Consider now the example of FIG. 8 of the present disclosure. FIG. 8 illustrates an example of projecting detected points into a virtual environment in accordance with embodiments of the disclosure.

In this example, a three-dimensional coordinate space X, Y, Z is provided as an example of a virtual environment in accordance with embodiments of the disclosure. The virtual space provided by this coordinate system is representative of a physical environment such as the baseball field 2000 described with reference to FIG. 2 of the present disclosure.

Three points A, B and C, which are associated with an object (such as the baseball bat 2006), have been projected (or mapped) into the virtual environment at a number of different instances of time.

The location of the plurality of points A, B and C associated with the baseball bat 2006 at a first instance of time 8000 is shown. This location has been determined from the detected location each of the respective plurality of points A, B and C across the images received from the image capture devices 2010 at the first instance of time 8000.

Then, as the baseball bat 2006 is swung by the batter 2002 in the physical environment, the image capture devices capture images of the plurality of points A, B and C at a second, third and fourth instance of time 8002, 8004 and 8006 respectively. Once the detecting unit 3002 has detected the location of the points A, B and C in each of the images received at each of these instances of time, the projecting unit may determine the location of the points A, B and C in the physical environment at each of these instances of time. The location of these points in the physical environment may then be projected into the virtual environment at the respective points in the virtual environment as shown in FIG. 8 of the present disclosure.

In this manner, the location of each of the plurality of points associated with the object can be determined from the images captured by the image capture devices (without the use of any additional equipment such as motion capture equipment or the like) and projected into a virtual space by the projection unit 3004

<Generating Unit>

Once the location of the plurality of points associated with the object within the physical environment have been determined and projected (or mapped) into the virtual environment as described above, the generating unit 3006 is configured to generate a path of the object through the virtual environment.

The path of the object through the virtual environment generated in accordance with embodiments of the disclosure represents the movement of the object through the physical environment as determined based on the plurality of points associated with the object, which have been detected by the detecting unit 3002. Indeed, as the path of the object is based on the detected position of the plurality of points associated with the object, the path of the object describes the position and orientation over time of the object. This is particularly advantageous when determining additional information regarding the object from the image data captured by the image capture devices, as is described in more detail below.

Returning now to FIG. 2 of the present disclosure, it will be appreciated that, in some examples, the object for which the path is being generated is a bat (such as a baseball bat 2006 described with reference to FIG. 2 of the present disclosure). In this specific example, the path of the object is therefore the swing of the bat, and wherein the swing of the bat is further indicative of the speed of the bat through the virtual environment (representative of the speed of the bat as swung by the batter 2002 in the physical environment). The swing of the bat may be the swing of the bat as swung by a batter when trying to hit a ball as described with reference to FIG. 2 of the present disclosure, for example.

In some examples, the generating unit 3006 of the present disclosure is configured to generate the path of the object through the virtual environment by fitting a curve through the location of the plurality of points associated with the object in the virtual environment. That is, once the projecting unit 3004 has projected the location of the plurality of points into the virtual environment, apparatus 1000 is able to apply certain additional processing to the plurality of points in order to generate information such as the path of the object through the virtual environment.

In particular, while the location of the plurality of points (as shown in FIG. 8 of the present disclosure) provides information regarding the position and orientation of the bat at the time of image capture, the path of the object simulates a smoothly varying position and orientation of the object in the virtual environment at any time (including, for example, an instance of time between 8000 and 8002 in the example of FIG. 8).

As such, generation of the path of the object by the generating unit enables the swing of the bat to be analysed and provides additional information regarding the swing of the bat which may not be available by viewing the stream of images captured by an image capture device 2010 in the physical environment (such as the images which are broadcast by a broadcaster, for example).

Consider, again, the example as described with reference to FIG. 8 of the present disclosure. In this example, the location of a point A associated with an object is shown at a number of locations within the virtual environment corresponding to the location of that point associated with the object at instance of time 8000, 8002, 8004 and 8006. The location of a second point B also associated with the object is shown at a number of locations within the virtual environment at the same instances of time 8000, 8002, 8004 and 8006. The generating unit 3006 of the present disclosure is, in some examples, configured to generate a path of the object through the virtual environment (representative of the movement of the object through the physical environment) by fitting a curve for each respective point at the different instances of time. For example, the generating unit may fit a curve through the respective locations of point A at instances of time 8000, 8002, 8004 and 8006. The generating unit 3006 may also fit a curve through the respective locations of point B at instances of time 8000, 8002, 8004 and 8006. These respective curves describe the movement of each of the points associated with the object through the virtual environment over time.

In some examples, the final path generated for the object may include a number of individual curves corresponding to the movement of each of the individual points associated with the object through the virtual environment over time. This enables an understanding of the relative position and orientation of the respective parts of the object as it moves through the virtual environment. Furthermore, in some examples, the points associated with the object may be used in order to place a three-dimensional model of the object (such as the baseball bat 2006) within the virtual environment. This enables additional information regarding how the object as a whole moves through the virtual environment and interacts with other objects within the virtual environment to be determined. The three-dimensional model may, in some examples, be a predetermined model of the object that has been created in advance. In other examples, the three-dimensional model of the object may be a model that has been developed over time by a machine learning or deep learning model such as that described with reference to FIG. 6 of the present disclosure. The movement of the three-dimensional model through the virtual environment is then manipulated using the curves that have been determined for each of the respective points (such as points A, B and C) associated with the object.

Figure 9:
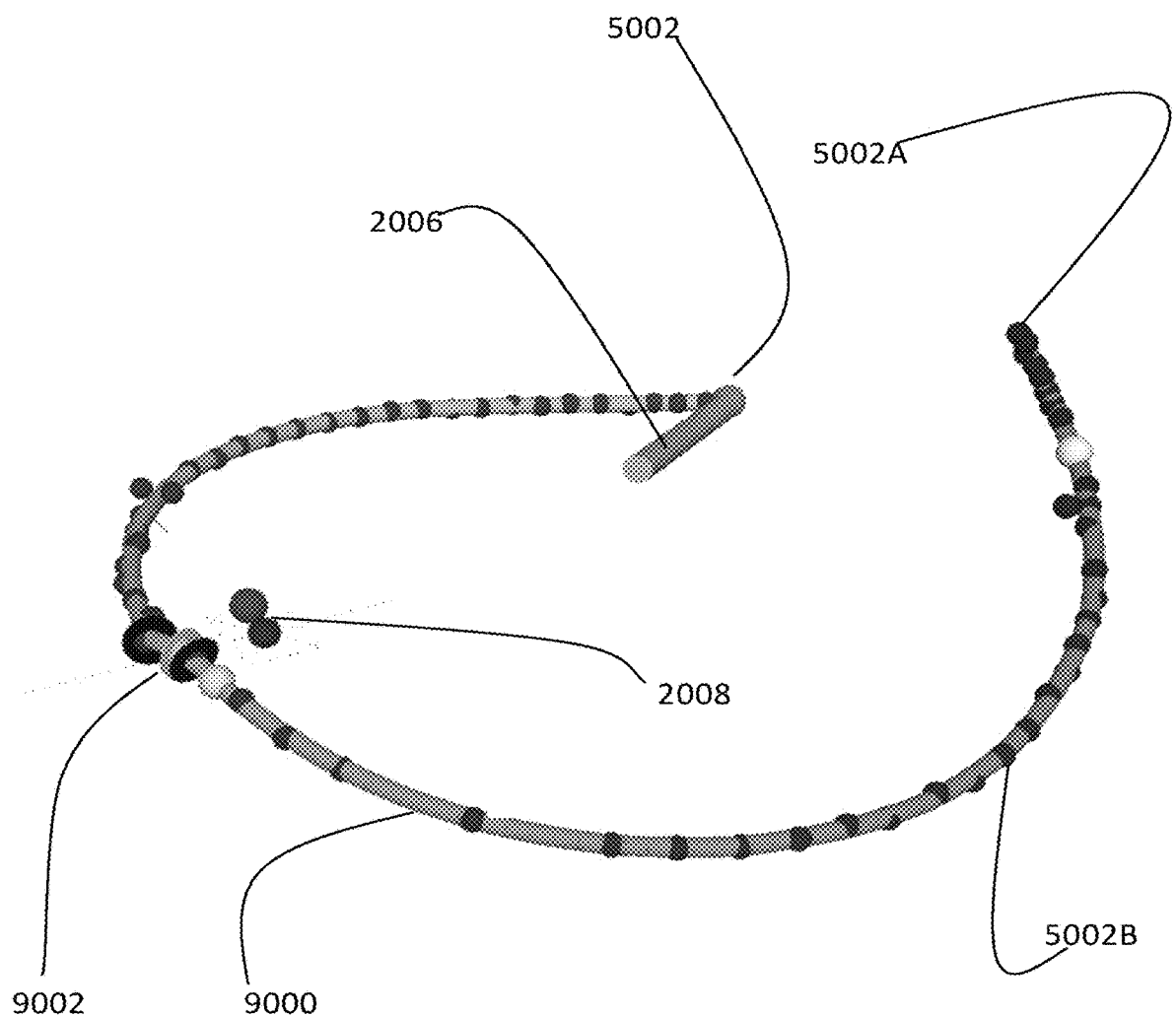
FIG. 9 illustrates an example of a path of an object through a virtual environment in accordance with embodiments of the disclosure.

Turning now to FIG. 9 of the present disclosure, an example of a path of an object through a virtual environment in accordance with embodiments of the disclosure is shown.

A plurality of points associated with an object (here, associated with the top of the baseball bat) are shown. These include point 5002A (at the start of the swing of the baseball bat) point 5002B (a certain point along the swing) and point 5002 (at the end of the swing of the baseball bat). Point 5002A is derived from images received from a plurality of image capture devices at a first instance of time, point 5002B is derived from images received from a plurality of image capture devices at a second instance of time after the first instance of time, and point 5002B is derived from images received from a plurality of image capture devices at a third instance of time after the second instance of time.

A path 9000 of the baseball bat through the virtual environment (related to the movement of the baseball bat when swung by the batter in the physical environment) is shown. This path has been generated by the generating unit using the plurality of points associated with the baseball bat. The path of the object describes the position and orientation of the object through the three-dimensional environment over time. In particular, it can be seen that the path describes the position and orientation of the object in the virtual environment even at a time during the swing between images which have been received from the image capture devices.

Furthermore, in this example, the generating unit has used the plurality of points in order to place a three-dimensional model of the baseball bat 2006 within the virtual environment. Here, the model of the baseball bat is shown only at the final location on the swing (corresponding to point 5002). However, manipulating controls through an input device (such as user input 1006) enables the model of the baseball bat 2006 to be shown at a position and orientation corresponding to any location along the path 9000.

In some examples, the virtual environment shown in FIG. 9 of the present disclosure may be displayed on a display device (such as display device 1010). That is, in some examples, the generating unit 3006 may further be configured to generate display information indicative at least of the path of the object through the virtual environment. Furthermore, in some examples, the virtual environment may be manipulated (e.g. rotated, panned, zoomed or the like) in order that the path of the baseball bat 2006 can be viewed from any angle within the virtual environment. Indeed, in some examples, the swing may be "played" such that a series of images, a video or an animation of the swing of the baseball bat along the path 9000 is displayed.

The method of fitting a curve through the plurality of points is not particularly limited, and any such method may be used as required by the situation to which the embodiments of the disclosure are applied. However, in some examples, fitting the curve through the location of the plurality of points associated with the object through the virtual environment may include fitting polynomial splines through the location of the plurality of points associated with the object in the virtual environment.

Figure 10A:
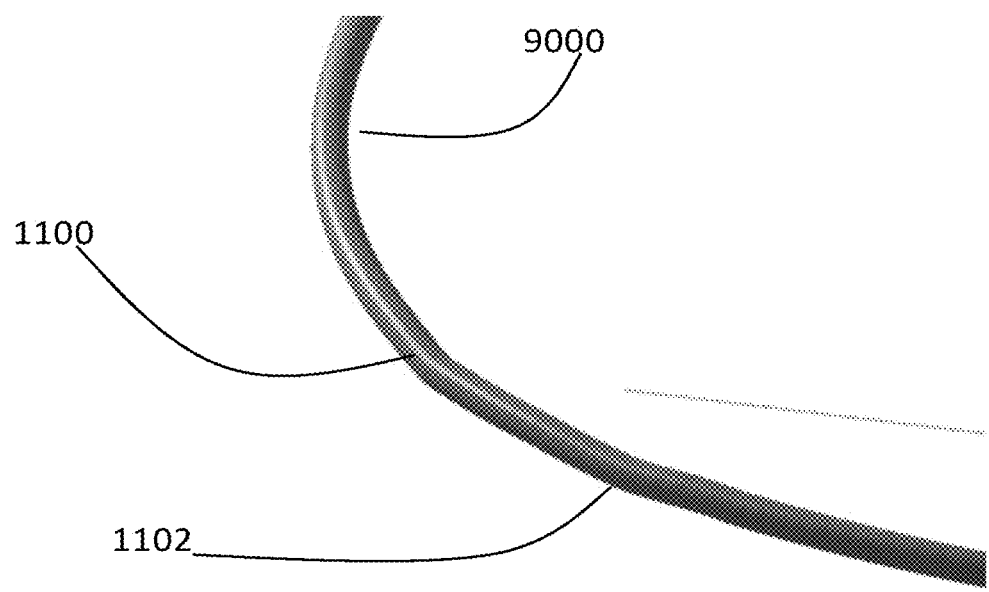
FIG. 10A illustrates an example of a path of an object through a virtual environment in accordance with embodiments of the disclosure.
Figure 10B:
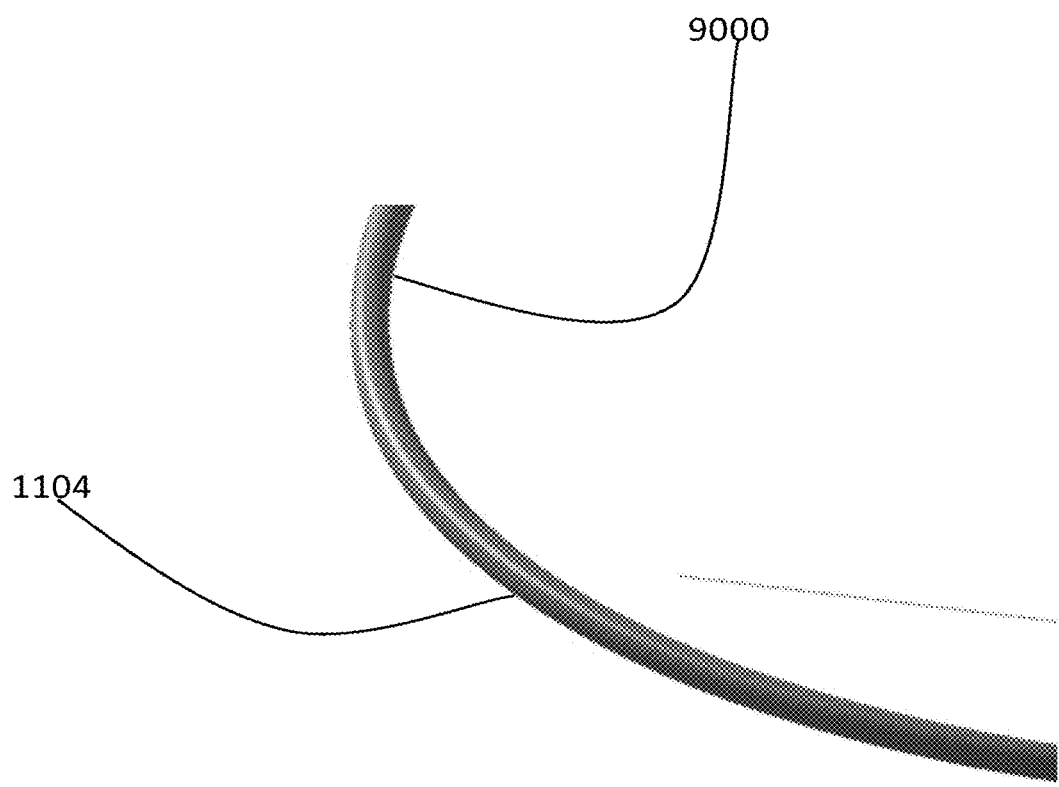
FIG. 10B illustrates an example of a path of an object through a virtual environment in accordance with embodiments of the disclosure.

FIGS. 10A and 10B illustrate an example of a path of an object through a virtual environment in accordance with embodiments of the disclosure. In the examples of FIGS. 10A and 10B, a close up of a section of the path 9000 described with reference to FIG. 9 of the present disclosure is shown. That is, FIGS. 10A and 10B show an enlarged portion of the path 9000 shown in FIG. 9 of the present disclosure.

In the example of FIG. 10A of the present disclosure, it can be seen that the path 9000, which has been generated by the generating unit, is not actually a smooth path through the virtual environment. Rather, there is a first kink (or discontinuity) in the path at location 1100 and a second kink at location 1102. These kinks may be caused for a number of reasons. Firstly, there may be a lack of images received from the image capture devices at the time in the vicinity of the locations 1100 and 1102 along the path 9000. Receiving fewer images of the object in a given vicinity along the path will lead to greater uncertainty in the path that has been generated which may, in turn, lead to a lack of smoothness in the path. Alternatively, one or more of the data points along the path in the location of 1100 and 1102 may be a spurious data point leading to the development of a kink in the path that has been generated by the generating unit 3006. This may occur when an image captured by an image capture device has been corrupted, for example.

A smoothly varying path will often provide the most accurate information regarding the position and orientation of the object (e.g. the bat). This is because a smoothly varying path provides a more accurate representation of the actual path the object has taken in the physical environment, since kinks in the path (arising from spurious data points, for example) have been smoothed out. As such, in order that additional information regarding the path of the object (such as the swing of the baseball bat) can be determined with most accuracy, it may therefore be desirable to smooth the path through the virtual environment that has been generated (in order to remove any kinks or discontinuities).

Accordingly, in some examples, the generating unit 3006 may optionally be further configured to apply a smoothing to the path 9000 which has been generated. Indeed, in some examples the generating unit may be configured to switch to spherical coordinate system in the virtual environment using an origin located at a centre of rotation of the object within the virtual environment. Any suitable transformation may be applied to switch from the coordinate system of the virtual space to a spherical coordinate system as required. Moreover, the centre of rotation of the object within the virtual environment may be determined using the position and orientation of the object along the path 9000 that has been generated over time. Again, the manner of determining the centre of rotation of the object along the path is not particularly limited in this regard. Then, the generating unit 3006 may apply a smoothing function to the curve to generate the path of the object through the virtual environment using the spherical coordinate system with the origin located at the centre of rotation.

FIG. 10B shows a close up of the path 9000 illustrated in FIG. 10A after the smoothing function has been applied to the path 9000. The path 9000 is a smooth path through the virtual environment. In particular, the path at location 1104 (corresponding to the region of the path between location 1100 and 1102 in FIG. 10A) is smooth. The kinks in the path at locations 1102 and 1104 have been removed by the smoothing function.

The smoothly varying path of the object shown in this example of FIG. 10B provides an improved representation of the movement of the baseball bat 2006 through the physical environment as swung by batter 2002, and enables more accurate additional information to be determined from the path of the object.

As noted above, the generating unit 3006 may be configured to generate display information of the virtual environment and/or the path which has been generated. This enables the virtual environment and/or the path that have been generated in accordance with embodiments of the disclosure to be displayed to a user. This user may, in examples, be a viewer who is watching images of the event being broadcast by a broadcaster. Display of the display information may therefore improve the understanding and sense of immersion of the event which can be obtained by the viewer.

In other examples, the user may be a person such as a teacher, trainer or coach who wishes to analyse the movement of the object 2006. Consider, again, the example of FIG. 2 of the present disclosure. Here, a player 2002 has swung a baseball bat in an attempt to hit a baseball 2002, which has been pitched. A coach may therefore wish to view the display information which has been generated in order to understand and analyse the player's technique. Indeed, in some examples, apparatus 1000 may further be configured to obtain information regarding a location of a person holding the object at the first instance of time and the at least one second instance of time; and including the information regarding the location of the person in the display information. Then, a person, such as the coach, is able to see the body positioning of the player when hitting the ball in addition to viewing the three-dimensional swing of the object through the virtual environment.

Furthermore, in some examples, the three-dimensional virtual path which has been generated may be displayed on its own as a complete display image. However, in other examples, the three-dimensional path which has been generated may also be displayed superimposed over one or more other images of the event (such as an image received from one of the image capture devices).

<Advantageous Technical Effects>

As previously described, it can be difficult obtain certain additional information regarding an object or event from images of that event. As such, the desire for additional information (such as information of the movement of the object through the environment) can exceed that which can be provided. However, according to embodiments of the disclosure, additional information (such as information of the swing of the object) can be generated. Specifically, according to embodiments of the disclosure, apparatus 1000 may efficiently and reliably generate a path for an object (such as the swing of a bat) through a virtual environment, based on images of the movement of that object in a real world environment. The path of the object enables the position and orientation of the object over time to be analysed. Therefore, a three-dimensional model of the swing of an object (such as a baseball bat) may be produced. Indeed, analysis of the path of the object may lead to improvements in performance of a physical task, since greater understanding of the position and orientation of the object over time can be obtained. This enables training to be specifically tailored and directed towards activities which lead to an improvement in the position and orientation of the object (such as improvements in the swing of the baseball bat).

Of course, the present disclosure is not particularly limited to the above-identified advantageous technical effects. Other technical effects will become apparent to the skilled person when reading the disclosure.

<Additional Modifications>

As described above, once the path of the object has been generated, the position and orientation of the object through the environment over time can be analysed. However, in some situations (such as in certain sporting events) it may be desired that an interaction between the object (such as a baseball bat) and a second object (such as a baseball) can also be analysed.

Therefore, in some examples, embodiments of the disclosure may also include detecting a location of a second object within the image data from the plurality of image capture devices at the first instance of time and/or at least one of the at least one second instances of time; and analysing an interaction between the second object and the bat using the swing (or generated path) of the bat and the detected location of the second object in order to determine information indicative of the interaction. The detection of the second object (e.g. a baseball) may be performed by performed the apparatus 1000 using the same technique as for the detection of a point associated with object 2006 as described with reference to FIGS. 5A, 5B and 6 of the present disclosure, for example. In particular, a trained model may be used in order to detect the location of the baseball within images received from the image capture devices, and the projecting unit 3004 may project the position of that baseball into the virtual environment.

Consider, again, FIG. 9 of the present disclosure, for example. In this example, the path 9000 of an object 2006 (e.g. a baseball bat) through the virtual environment has been generated in accordance with embodiments of the disclosure. Furthermore, the position of an object 2008 (e.g. a baseball) has also been detected. The position of the object 2008 which is shown corresponds to the position of the baseball at the time when the baseball bat 2006 is at position 5002. The example illustrated in FIG. 9 of the present disclosure may correspond to the situation described with reference to FIG. 2 of the present disclosure, where a batter swings a bat in order to hit (or otherwise make contact with) a ball which has been pitched towards the batter.

As can be seen in FIG. 9, an interaction between the baseball bat 2006 and the baseball 2008 occurred at location 9002 on the path 9000 (the location of the baseball at time corresponding to location 9002 along path 9000 is not shown in this example). As the position and orientation of the baseball bat 2006 through the three-dimensional environment is known from the path which has been generated, the speed of the baseball bat over time may also be determined using this information.

The path 9000 of the baseball bat and the detected location of the baseball may therefore be analysed in order to determine information regarding the interaction between the baseball bat 2006 and the baseball.

In some examples, information indicative of the interaction between the baseball bat 2006 and the baseball may include information regarding an impact location of the ball on the bat, a speed of the ball relative to the bat at a time prior to impact between the ball and the bat (such as a time immediately preceding the impact between the bat and the ball, for example), and an energy transfer between the ball and the bat at time of impact.

In certain situations (such as a sporting event) analysis of the impact location of the ball on the bat may be particularly advantageous because it may provide an understanding as to the 'quality' of the hit. That is, an object (such as a baseball bat) may have a so-called sweet spot, which is a point on the object that makes for the most effective contact with the ball. Therefore, by determining whether impact was made with the ball in the sweet spot of the bat, the quality of the swing of the object can be determined. When contact has been made with the sweet spot, the quality of the hit will be higher. Indeed, if analysis of the path of the bat shows that the ball made contact with the bat at a point on the bat that is substantially removed from the sweet spot, this information may be used as a training device to improve further swings made by the batter. That is, it may be recommended that the batter modifies the swing of the bat in order to make improved contact with the ball and/or focuses future practice on ensuring that the ball is hit with the sweet spot of the bat.

Furthermore, in examples, apparatus 1000 may further be configured to compare the information indicative of the interaction with a detected location and/or a detected path of the ball after the interaction in order to generate information regarding a quality of the interaction. Comparing information about the interaction (such as the speed of the ball relative to the bat at the time of impact, for example) with the movement of the ball after impact may provide further information about the quality of the contact which has been made. That is, if the movement of the ball after the impact is good (e.g. the ball travels for a long distance after being hit) then the information of the interaction may be analysed in order to determine what factors of the impact lead to the positive outcome of the hit. Conversely, if the ball does not travel far after the hit, then the interaction can be studied and compared to previous interactions in order to determine and understand the factors that lead to a negative outcome of the hit. This enables a person (such as a coach or a player) to understand how they can further improve performance within a sporting event when an outcome (e.g. the trajectory of the baseball after contact with the baseball bat 2006) is not as good as expected. This may further improve the training and teaching outcome, leading to an improvement in the performance of a physical skill.

In some examples, once the plurality of points have been detected and the object has been projected into the virtual environment, it may be desired that the three-dimensional position of the object is optimized in order to further improve the accuracy and reliability of the generation of the path of the object through the virtual environment. In many example situations (such as when the object is a bat, for example) the object may not have sharp edges within the image data. In particular, edges of the object in the image data from the image capture devices may appear less sharp when the object has spherical and/or cylindrical shape (or construction). As such, optimization techniques which require sharp edges in the image data may not be the most efficient for optimizing the location of the object (such as a bat).

Accordingly, in embodiments of the disclosure, an optimization of the location of the object may, for example, be based on a segmentation of the bat within the image data from the image capture devices (e.g. classification of pixels of image data as being bat or non-bat pixels (based on a pixel property such as colour) for example)). This may be performed both individually and collectively for the respective image capture devices. That is, pixels with a certain attribute (e.g. a certain colour) can be identified as "bat" pixels, while pixels which do not have this attribute (e.g. do not match a certain colour) can be identified as "non-bat" pixels.

As such, in examples, once the three-dimensional position of the object (such as the bat) has been determined for a given instance of time (e.g. an initial three-dimensional location of the model of the object), the model of the bat can be projected into the image data from an image capture device (such that an image of the model of the object is overlaid on the image received from the image capture device). Then, using this overlaid image, the difference in position of the model of the bat (projected into the image data) and the image of the bat in the original image data (as received from the image capture device) can be determined. In examples, the difference in position of the model of the bat (projected into the image data) and the image of the bat in the original image data (as received from the image capture device) can be determined as a quantitate value or score for the image (e.g. a comparison score). That is, in examples, the number of "correct" pixels (where the model of the bat overlays the image of the bat) may increase the score, while the number of "incorrect" pixels (where the model of the bat does not align with the image of the bat) decrease the score for that image. Furthermore, in examples, the score which is determined for an image capture device can be normalized based on the expected number of pixels (to account for the different zoom levels for each image capture device). This improves comparison between a number of different image capture devices.

The score based on the model of the bat (projected into the image data) compared to the location of the bat in the original image data (i.e. the image data received from the image capture device) can then be determined, individually, for the image data from each respective image capture device.

In addition, once the score has been determined for each image capture device, a collective or combined score for the plurality of image capture devices can be determined using the individual scores from each image capture device (e.g. by adding the scores determined for each individual image capture device at that instance of time). This produces an "all-camera score" for the location of the model of the bat compared to the original image data at that instance of time.

Once calculated, the "all-camera score" can be used in order to optimize the position of the model of the bat at that instance of time. That is, in examples, once the "all-camera score" has been calculated, the position of the model of the object at that instance of time which has been calculated can be perturbed by a small transformation (including both translational and rotational transformation) from its initial determined position at that instance of time. The model of the object, once perturbed, can then, again, be projected into each of the individual images in order to produce a new overlay image for each image capture device (with the new location of the model (perturbed by a small transformation from the initial determined location) and the image as received from the image capture device). Then, using this new overlaid image, the difference in the new position of the model of the bat (projected into the image data) and the image of the bat in the original image data (received from the image capture device) can be determined. A score for each individual image capture device and an overall combined score for the image capture devices (the "all-camera score") can be determined.

If the new three-dimensional position of the object is an improvement (i.e. a closer match) to the received image data than the original three-dimensional position of the object, that new three-dimensional position will achieve a better score (e.g. a higher score, for example). In fact, if the new three-dimensional score results in an improved "all-camera score", then at least one individual image capture device must have a better individual (or "single-camera") score. Accordingly, for each image capture device, it possible to take the model position which produces the best "single-camera" score for a given image capture device and calculate the "all-camera score" (i.e. across all image capture devices) for that model position. Then, the model position which produces the best "all-camera score" from amongst this selection of best individual "single-camera score" positions is the best position of the model of the bat (producing the closest match with the individual image data when projected into the individual image data which has been received).

Iterating this process (with small perturbations to the new best model position (starting with the original position of the model which has been determined)) shifts the three-dimensional model of the bat into an optimized position within the virtual environment.

In some examples, this iterative process for the optimization of the position of the three-dimensional model may continue for a predetermined number of iterations. Alternatively, the process may continue for a predetermined amount of time and/or until a predetermined level of optimization (such as a predetermined "all camera-score" is achieved). Further alternatively, the iterative process may continue until no significant further improvement in the optimization of the position of the three-dimensional model is achieved for a predetermined number of iterations.

By optimizing the position of the three-dimensional model which has been determined in this manner, an improved and more accurate position of the three-dimensional model at each instance of time can be efficiently determined. This further facilities the efficient and reliable generation of a path for an object (such as the swing of a bat) through a virtual environment.

<Method>

Additionally, a method of generating a path of an object through a virtual environment is provided in accordance with embodiments of the present disclosure.

Figure 11:
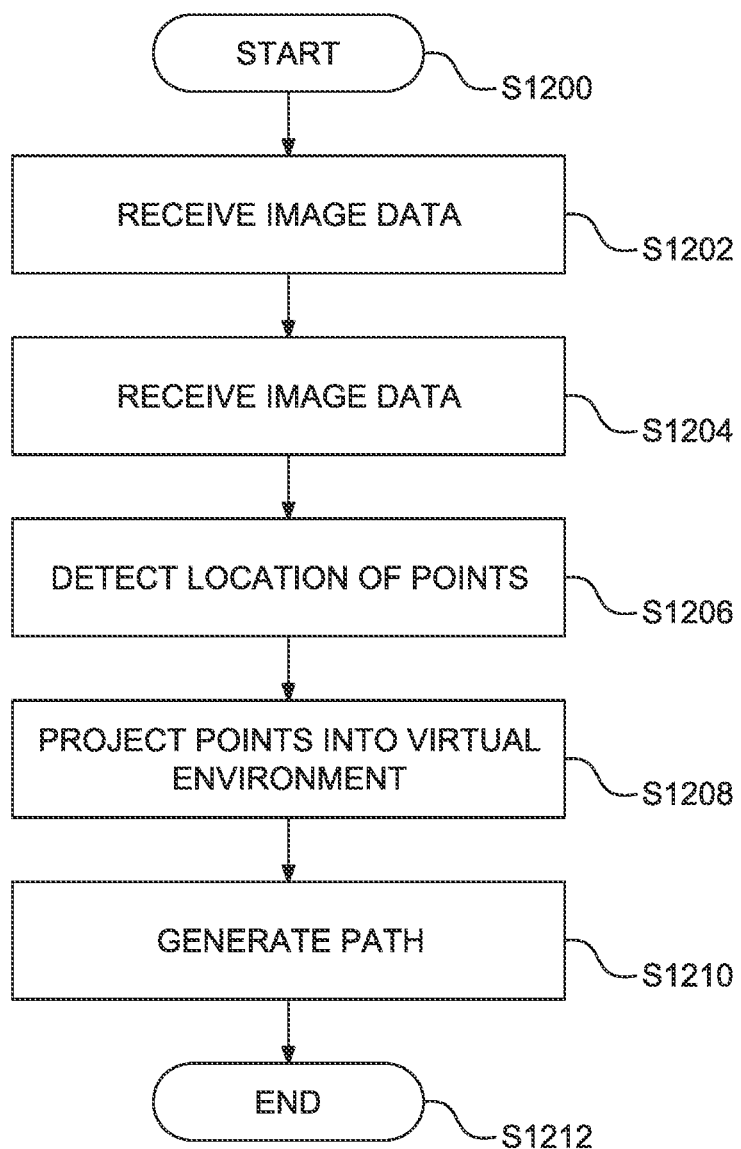
FIG. 11 illustrates a method according to embodiments of the disclosure.

An example of the method of generating a path of an object through a virtual environment is illustrated in FIG. 11 of the present disclosure. This method may, optionally, be performed by an apparatus such as apparatus 1000 illustrated with reference to FIGS. 1 and 3 of the present disclosure, for example.

The method starts at step S1200, and proceeds to step S1202.

In step S1202, the method comprises receiving image data, at a first instance of time, from a plurality of image capture devices arranged in a physical environment.

Then, when this image data has been received, the method proceeds to step S1204.

In step S1204, the method comprises receiving image data, at an at least one second instance of time after the first instance of time, from a plurality of image capture devices arranged in the physical environment.

In step S1206 of the example method, the method comprises detecting a location of a plurality of points associated with an object within the image data from each image capture device at the first instance of time and the at least one second instance of time.

The method then proceeds to step S1208.

In step S1208 the method comprises projecting the location of the plurality of points associated with the object within the image data from each image capture device at the first instance of time and the at least one second instance of time into a virtual environment to generate a location of the plurality of points associated with the object in the virtual environment at each instance of time.

The method then proceeds to step S1210.

Step S1210 comprises generating a path of the object through the virtual environment using the location of the plurality of points associated with the object in the virtual environment, the path being indicative of the position and orientation of the object through the virtual environment.

Finally, the method proceeds to, and ends with, step S1212.

Numerous modifications may be made to this method depending on the situation in which the embodiments of the disclosure are applied. Indeed, in some examples the method steps may be performed in the order indicated above. In other examples, certain steps of the method may be performed in a different sequence to that illustrated in the example of FIG. 11 and/or may be performed in parallel to the other steps of the method. Specifically, for example, step S1206, comprising detection of a location of points associated with an object within the image data, can be performed in parallel to steps S1202 and S1204 such that the plurality of points are detected image by image as that image data is received.

Clauses

It will be appreciated that embodiments of the present disclosure may further be arranged in accordance with the following numbered clauses:

1. Method of generating a path of an object through a virtual environment, the method comprising:

receiving image data, at a first instance of time, from a plurality of image capture devices arranged in a physical environment;

receiving image data, at an at least one second instance of time after the first instance of time, from a plurality of image capture devices arranged in the physical environment;

detecting a location of a plurality of points associated with an object within the image data from each image capture device at the first instance of time and the at least one second instance of time;

projecting the location of the plurality of points associated with the object within the image data from each image capture device at the first instance of time and the at least one second instance of time into a virtual environment to generate a location of the plurality of points associated with the object in the virtual environment at each instance of time; and generating a path of the object through the virtual environment using the location of the plurality of points associated with the object in the virtual environment, the path being indicative of the position and orientation of the object through the virtual environment.

2. The method according to Clause 1, wherein the object is a bat and the path of the object is a swing of the bat, and wherein the swing of the bat is further indicative of the speed of the bat through the virtual environment.

3. The method according to Clause 2, wherein the method further includes: detecting a location of a second object within the image data from the plurality of image capture devices at the first instance of time and/or at least one of the at least one second instances of time; and analysing an interaction between the second object and the bat using the swing of the bat and the detected location of the second object to determine information indicative of the interaction.

4. The method according to Clause 3, wherein the second object is a ball and wherein the information indicative of the interaction includes information regarding an impact location of the ball on the bat, a speed of the ball relative to the bat at a time prior to impact between the ball and the bat, and an energy transfer between the ball and the bat at time of impact.

5. The method according to Clause 4, further comprising comparing the information indicative of the interaction with a detected location and/or a detected path of the ball after the interaction in order to generate information regarding a quality of the interaction.

6. The method according to any of Clauses 2 to 5, wherein the plurality of points associated with the object include at least a point on the distal portion of the bat and a point located between the distal portion of the bat and a proximal portion of the bat.

7. The method according to Clause 6, wherein when the proximal portion of the bat is not detectable in the image data, the method further includes determining a location of the proximal portion of the bat by projecting a line, using the orientation of the bat, from the distal portion of the bat, wherein a property of the line is determined using a model of the bat.

8. The method according to any of Clauses 2 to 7, wherein the bat is a baseball bat.

9. The method according to any preceding Clause, wherein the plurality of points associated with the object correspond to a number of predetermined distinguishable regions on the object.

10. The method according to any preceding Clause, wherein detecting the location of the plurality of points associated with the object within the image data includes the use of a trained model to identify the object and/or the plurality of points associated with the object within the image data.

11. The method according to Clause 10, wherein the method includes training the trained model using at least one of simulated image data and/or historical image data of the object.

12. The method according to Clause 11, wherein the trained model is a machine learning model.

13. The method according any preceding Clause, wherein the method comprises: determining a portion of the image data comprising the object; and detecting the location of the plurality of points associated with the object using the portion of the image data.

14. The method according to Clause 13, wherein when the plurality of points could not be detected in the image data of at least one of the at least one second instances of time, the method further comprises:

triangulating the locations of the plurality of points associated with an object across the image data in which the plurality of points could be detected to project the plurality of points into the virtual environment;

generating a three-dimensional bounding box for the object enclosing the plurality of points within the virtual environment;

using the three-dimensional bounding box to re-define a portion of the image data in which the object is located for the image data in which the plurality of points could not be detected; and detecting a location of the plurality of points associated with the object within the image data in which the plurality of points could not be detected using the re-defined portion of the image data.

15. The method according to any preceding Clause, wherein detecting the location of the plurality of points associated with the object includes generating a heat map indicative of the location of the points of the object.

16. The method according to any preceding Clause, wherein the method comprises projecting the location of the plurality of points associated with the object within the image data into the virtual environment using information indicative of the location of the image capture devices within the physical environment at the time of image capture.

17. The method according to any preceding Clause, wherein generating the path of the object through the virtual environment includes fitting a curve through the location of the plurality of points associated with the object in the virtual environment.

18. The method according to Clause 17, wherein fitting the curve through the location of the plurality of points associated with the object through the virtual environment includes fitting polynomial splines through the location of the plurality of points associated with the object in the virtual environment.

19. The method according to Clause 18, wherein the method further includes: switching to a spherical coordinate system in the virtual environment using an origin located at a centre of rotation of the object within the virtual environment; and applying a smoothing function to the curve to generate the path of the object through the virtual environment.

20. The method according to any preceding Clause, wherein the method further comprises placing a three-dimensional model of the object within the virtual environment at a location determined using at least one of the location of the plurality of points associated with the object and the path of object which has been generated.

21. The method according to Clause 20, wherein the method further includes obtaining information regarding a location of a person holding the object at the first instance of time and the at least one second instance of time; and including the information regarding the location of the person in the display information.

22. The method according to Clause 1, wherein the method comprises receiving the image data at a time of image capture; or receiving the image data when a trigger event has been determined to have occurred.

23. The method according to any preceding Clause, wherein the method comprises optimizing the location of the plurality of points associated with the object at a given instance of time using a comparison of a projection of the model into the image data received from the image capture device and a location of the object in the image data.

24. The method according to Clause 23, wherein optimizing the location of the plurality of points associated with the object at a given instance of time further comprises:
projecting a model of the object at that location into the image data received from the image capture devices;
generating an optimization value based on a comparison of the projected model of the object with a location of the object in the image data;
perturbing the location of the plurality of points associated with the object to generate a new location of the plurality of points associated with the object;
projecting the model of the object into the image data at the new location of the plurality of points to generate a new projection of the object;
generating a new optimization value for the new projection of the model of the object, based on a comparison of the new projection of the model with the location of the object in the image data; and
selecting a location of the plurality of points corresponding to a best value of the optimization value which has been determined.

25. Apparatus for generating a path of an object through a virtual environment, the apparatus comprising circuitry configured to:
receive image data, at a first instance of time, from a plurality of image capture devices arranged in a physical environment;
receive image data, at an at least one second instance of time after the first instance of time, from a plurality of image capture devices arranged in the physical environment;
detect a location of a plurality of points associated with an object within the image data from each image capture device at the first instance of time and the at least one second instance of time;
project the location of the plurality of points associated with the object within the image data from each image capture device at the first instance of time and the at least one second instance of time into a virtual environment to generate a location of the plurality of points associated with the object in the virtual environment at each instance of time; and generate a path of the object through the virtual environment using the location of the plurality of points associated with the object in the virtual environment, the path being indicative of the position and orientation of the object through the virtual environment.

26. Computer program product comprising instructions which, when the program is implemented by a computer, cause the computer to perform a method of generating a path of an object through a virtual environment, the method comprising:
receiving image data, at a first instance of time, from a plurality of image capture devices arranged in a physical environment;
receiving image data, at an at least one second instance of time after the first instance of time, from a plurality of image capture devices arranged in the physical environment;
detecting a location of a plurality of points associated with an object within the image data from each image capture device at the first instance of time and the at least one second instance of time;
projecting the location of the plurality of points associated with the object within the image data from each image capture device at the first instance of time and the at least one second instance of time into a virtual environment to generate a location of the plurality of points associated with the object in the virtual environment at each instance of time; and generating a path of the object through the virtual environment using the location of the plurality of points associated with the object in the virtual environment, the path being indicative of the position and orientation of the object through the virtual environment.

While embodiments of the disclosure have been described with reference to the example of the swing of a baseball bat, it will be appreciated that the present disclosure is not particularly limited in this regard. That is, embodiments of the present disclosure may also be applied in order to many different sports in order to generate a path of an object. For example, embodiments of the disclosure may be applied to the sport of tennis such that the path of a tennis racket can be generated. Alternatively, embodiments of the disclosure may be applied to the sport of golf such that the path of a golf club may be generated. Furthermore, embodiments of the disclosure may be applied to the sport of cricket, such that the swing of a cricket bat may be generated, for example. In fact, embodiments of the disclosure may be applied to any number of different types of sports as required in order to generate information regarding the path of an object.

Moreover, embodiments of the disclosure are not particularly limited to the examples of a sporting event. Rather, embodiments of the disclosure may also be applied to any other type of event where it is desired that the path of an object, including the position and orientation of the object, through an environment can be analysed.

While numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

The invention claimed is:

1. A method of generating a path of an object through a virtual environment, the method comprising:
receiving first image data, at a first instance of time, from a first plurality of image capture devices arranged in a physical environment;
receiving second image data, at an at least one second instance of time after the first instance of time, from a second plurality of image capture devices arranged in the physical environment;
detecting a location of a plurality of points associated with an object within the first image data at the first instance of time and within the second image data at the at least one second instance of time;
projecting the location of the plurality of points associated with the object at the first instance of time and the at least one second instance of time into a virtual environment to generate a virtual location of the plurality of points associated with the object in the virtual environment at each instance of time; and
generating the path of the object through the virtual environment using the virtual location of the plurality of points associated with the object in the virtual environment, the path being indicative of the position and orientation of the object through the virtual environment,
wherein the object is a bat and the path of the object is a swing of the bat, and the swing of the bat is further indicative of a speed of the bat through the virtual environment,
wherein the method further includes detecting a location of a second object within the first image data at the first instance of time and/or within the second image data at the at least one second instance of time, and analyzing an interaction between the second object and the bat using the swing of the bat and the detected location of the second object to determine information indicative of the interaction,
wherein the plurality of points associated with the bat include at least a point on the distal portion of the bat and a point located between the distal portion of the bat and a proximal portion of the bat, and
wherein when the proximal portion of the bat is not detectable in the first or second image data, the method further includes determining a location of the proximal portion of the bat by projecting a line, using the orientation of the bat, from the distal portion of the bat.

2. The method according to claim 1, wherein the second object is a ball and wherein the information indicative of the interaction includes information regarding an impact location of the ball on the bat, a speed of the ball relative to the bat at a time prior to an impact between the ball and the bat, and an energy transfer between the ball and the bat at a time of the impact.

3. The method according to claim 2, further comprising comparing the information indicative of the interaction with a detected location and/or a detected path of the ball after the interaction in order to generate information regarding a quality of the interaction.

4. The method according to claim 1, wherein a property of the line is determined using a model of the bat.

5. The method according to claim 1, wherein the bat is a baseball bat.

6. The method according to claim 1, wherein the plurality of points associated with the object correspond to a number of predetermined distinguishable regions on the object.

7. The method according to claim 1, wherein detecting the location of the plurality of points associated with the object within the first and second image data includes the use of a trained model to identify the object and/or the plurality of points associated with the object within the first and second image data.

8. The method according to claim 7, further comprising training the trained model using at least one of simulated image data and/or historical image data of the object.

9. The method according to claim 8, wherein the trained model is a machine learning model.

10. The method according to claim 1, further comprising determining a portion of the first image data comprising the object and detecting the location of the plurality of points associated with the object using the portion of the first image data.

11. The method according to claim 10, wherein when the plurality of points cannot be detected in the second image data, the method further comprises:
triangulating the locations of the plurality of points associated with an object across the second image data in which the plurality of points could be detected to project the plurality of points into the virtual environment;
generating a three-dimensional bounding box for the object enclosing the plurality of points within the virtual environment;
using the three-dimensional bounding box to re-define a portion of the second image data in which the object is located for the second image data in which the plurality of points cannot be detected; and
detecting the location of the plurality of points associated with the object within the second image data in which the plurality of points cannot be detected using the re-defined portion of the second image data.

12. The method according to claim 1, wherein detecting the location of the plurality of points associated with the object includes generating a heat map indicative of the location of the points of the object.

13. The method according to claim 1, further comprising projecting the location of the plurality of points associated with the object within the first image data into the virtual environment using information indicative of the location of the image capture devices within the physical environment at the time of image capture.

14. The method according to claim 1, wherein generating the path of the object through the virtual environment includes fitting a curve through the location of the plurality of points associated with the object in the virtual environment.

15. The method according to claim 14, wherein fitting the curve through the location of the plurality of points associated with the object through the virtual environment includes fitting polynomial splines through the location of the plurality of points associated with the object in the virtual environment.

16. The method according to claim 15, further comprising switching to a spherical coordinate system in the virtual environment using an origin located at a center of rotation of the object within the virtual environment, and applying a smoothing function to the curve to generate the path of the object through the virtual environment.

17. The method according to claim 1, further comprising placing a three-dimensional model of the object within the virtual environment at a location determined using at least one of the location of the plurality of points associated with the object and the path of object which has been generated.

18. An apparatus for generating a path of an object through a virtual environment, the apparatus comprising circuitry configured to:
receive first image data, at a first instance of time, from a first plurality of image capture devices arranged in a physical environment;
receive second image data, at an at least one second instance of time after the first instance of time, from a second plurality of image capture devices arranged in the physical environment;
detect a location of a plurality of points associated with an object within the first image data at the first instance of time and within the second image data at the at least one second instance of time;
project the location of the plurality of points associated with the object within the first image data at the first instance of time and the at least one second instance of time into a virtual environment to generate a virtual location of the plurality of points associated with the object in the virtual environment at each instance of time; and
generate the path of the object through the virtual environment using the virtual location of the plurality of points associated with the object in the virtual environment, the path being indicative of the position and orientation of the object through the virtual environment,
wherein the object is a bat and the path of the object is a swing of the bat, and the swing of the bat is further indicative of a speed of the bat through the virtual environment,
wherein the circuitry is further configured to detect a location of a second object within the first image data at the first instance of time and/or within the second image data at the at least one second instance of time, and analyze an interaction between the second object and the bat using the swing of the bat and the detected location of the second object to determine information indicative of the interaction,
wherein the plurality of points associated with the bat include at least a point on the distal portion of the bat and a point located between the distal portion of the bat and a proximal portion of the bat, and
wherein when the proximal portion of the bat is not detectable in the first or second image data, the circuitry is further configured to determine a location of the proximal portion of the bat by projecting a line, using the orientation of the bat, from the distal portion of the bat.

19. A non-transitory computer-readable medium comprising instructions which, when executed by a computer, cause the computer to perform a method of generating a path of an object through a virtual environment, the method comprising:
receiving first image data, at a first instance of time, from a first plurality of image capture devices arranged in a physical environment;
receiving second image data, at an at least one second instance of time after the first instance of time, from a second plurality of image capture devices arranged in the physical environment;
detecting a location of a plurality of points associated with an object within the first image data at the first instance of time and within the second image data at the at least one second instance of time;
projecting the location of the plurality of points associated with the object at the first instance of time and the at least one second instance of time into a virtual environment to generate a virtual location of the plurality of points associated with the object in the virtual environment at each instance of time; and
generating the path of the object through the virtual environment using the virtual location of the plurality of points associated with the object in the virtual environment, the path being indicative of the position and orientation of the object through the virtual environment,
wherein the object is a bat and the path of the object is a swing of the bat, and the swing of the bat is further indicative of a speed of the bat through the virtual environment,
wherein the method further includes detecting a location of a second object within the first image data at the first instance of time and/or within the second image data at the at least one second instance of time, and analyzing an interaction between the second object and the bat using the swing of the bat and the detected location of the second object to determine information indicative of the interaction,
wherein the plurality of points associated with the bat include at least a point on the distal portion of the bat and a point located between the distal portion of the bat and a proximal portion of the bat, and
wherein when the proximal portion of the bat is not detectable in the first or second image data, the method further includes determining a location of the proximal portion of the bat by projecting a line, using the orientation of the bat, from the distal portion of the bat.

* * * * *